United States Patent [19]
Kimura et al.

[11] Patent Number: 5,122,715
[45] Date of Patent: Jun. 16, 1992

[54] DRIVE DEVICE FOR A BRUSHLESS MOTOR

[75] Inventors: Yoshitsugu Kimura, Sabae; Masahiro Yasohara, Amagasaki; Hiromitsu Nakano, Hirakata, all of Japan

[73] Assignee: Matsushita Electric Industrial Co., Ltd., Osaka, Japan

[21] Appl. No.: 391,609

[22] PCT Filed: Nov. 18, 1988

[86] PCT No.: PCT/JP88/01169

§ 371 Date: Jul. 19, 1989

§ 102(e) Date: Jul. 19, 1989

[87] PCT Pub. No.: WO89/05061

PCT Pub. Date: Jun. 1, 1989

[30] Foreign Application Priority Data

| Nov. 20, 1987 | [JP] | Japan | 62-294404 |
| Nov. 20, 1987 | [JP] | Japan | 62-294405 |
| Nov. 27, 1987 | [JP] | Japan | 62-300731 |
| Jan. 18, 1988 | [JP] | Japan | 63-7752 |
| Feb. 4, 1988 | [JP] | Japan | 63-24226 |
| Mar. 15, 1988 | [JP] | Japan | 63-60999 |
| Mar. 15, 1988 | [JP] | Japan | 63-61000 |

[51] Int. Cl.⁵ .................................................. H02P 6/02
[52] U.S. Cl. ........................................ 318/138; 318/254
[58] Field of Search .................. 318/254, 138, 439; 388/805, 813

[56] References Cited

U.S. PATENT DOCUMENTS 4,900,993  2/1990  Yasohara et al. .................. 318/254

FOREIGN PATENT DOCUMENTS 61-170292  7/1986  Japan .

Primary Examiner—David Smith, Jr.
Attorney, Agent, or Firm—Wenderoth, Lind & Ponack

[57] ABSTRACT

A brushless motor driving device includes a plurality of motor driving coils and a plurality of driving transistors, coupled to the motor driving coils, for periodically supplying an electric power to the motor driving coils. A power supply switching circuit is provided for generating a power supply switching signal for driving the motor driving coils on the basis of a frequency signal corresponding to an oscillation frequency of a voltage controlled oscillator. A phase difference detector is provided for detecting a difference between the power supply switching signal and a counterelectromotive voltage generated in the motor driving coils during a period in which no electric power is supplied to the motor driving coils. The phase difference detected by the phase different detector circuit is used to control the oscillation frequency of the voltage controlled oscillator.

5 Claims, 20 Drawing Sheets

POWER SUPPLY TIMING

DRIVE DEVICE FOR A BRUSHLESS MOTOR

FIELD OF TECHNOLOGY

The present invention relates to a drive device for a brushless motor which does not make use of a position detector for detecting the position of a movable element of an electric motor.

BACKGROUND ART

With a view to improving service life and reliability, the brushless motor is being largely employed for various drive motors. In general, the brushless motor requires the use of a position detector for detecting the position of a movable element. However, in order to further reduce price and size, a brushless motor which does not require the use of a position detector is necessary. A conventional example of a drive device for such a brushless motor is disclosed in, for example, the Japanese Laid-open Patent Publication No. 52-80415.

Hereinafter, the above described conventional drive device for the brushless motor will be discussed with reference to the drawings.

FIG. 17 is a circuit diagram of the conventional drive circuit for the brushless motor. In FIG. 17, driving coils 1 to 3 are connected at their one end to each other. The driving coil 1 is connected at the other end to the anode of a diode 4, the cathode of a diode 5 and the respective collectors of driving transistors 10 and 13. The driving coil 2 is connected at the other end to the anode of a diode 6, the cathode of a diode 7 and the respective collectors of driving transistors 11 and 14. The driving coil 3 is connected at the other end to the anode of a diode 8, the cathode of a diode 9 and the respective collectors of driving transistors 12 and 15. The respective cathodes of the diodes 4, 6 and 8 and the respective emitters of the driving transistors 10, 11 and 13 are connected to a positive power supply line, and the respective anodes of the diodes 5, 7 and 9 and the respective emitters of the transistors 13, 14 and 15 are connected to ground. The other ends of the driving coils 1 to 3 are also connected with a filtering circuit 16 which generates an output to a power supply switching circuit 17. An output from the power supply switching circuit 17 is supplied t the respective bases of the driving transistors 10 to 15.

The drive device for the brushless motor, which is so constructed as hereinabove described, operates in the following manner.

FIG. 18 is a diagram for explaining the operation of the device shown in FIG. 17, wherein Uo, Vo and Wo represent the respective waveforms of the electric power signals supplied to the driving coils 1, 2 and 3. The power supply waveform Uo, Vo and Wo have their high harmonic components removed by the filtering circuit 16 and are respectively converted by the filtering circuit 16 into output signals F1, F2 and F3 which are delayed 90° in phase. It is noted that the filtering circuit 16 is a primary filter and is constituted by, for example, a RC passive filter, a primary Miller integrator, etc., the cut-off frequency of which is set to a sufficiently low region as compared with the frequencies of the power supply waveforms across the coils. The output signals F1, F2 and F3 are inputted to the power supply switching circuit 17. The power supply switching circuit 17 is constituted by a logic circuit and is adapted to logically process the output signals F1, F2 and F3 into control signals $U_H$, $U_L$, $V_H$, $V_L$, $W_H$ and $W_L$ which are in turn are supplied to the bases of the driving transistors 10 to 15 to cause the latter to perform their respective switching operations. At this time, the switching operations are carried out so that a motor driving torque is generated in one direction at all times for driving a motor.

In the prior art construction, it is necessary to use a filtering circuit having a cut-off frequency characteristic for each phase of the driving coils and, accordingly, a number of capacitors having a high capacitance is required.

Also, where the inductance of the driving coils is high, the power supply current to be passed through the coils tends to be delayed in time after the driving transistors are switched on, and permanent magnetic fields tend to be degaussed by magnetic fields generated by the driving coils. A so-called armature reaction exists. In such case, it is well known that, when the driving coils are supplied with an electric power at such timings as shown in FIG. 18, the efficiency tends to be lowered. As a countermeasure, a technique in which the signals F1, F2 and F3 are somewhat advanced in phase to operate the driving transistors so as to compensate for a delay in power supply resulting from the armature reaction is disclosed in the Japanese Laid-open Patent Publication No. 52-80145, however, component parts, such as capacitors, are further required. Also, since the power supply waveforms Uo, Vo and Wo tend to be accompanied by spike noises generated when the driving transistors are switched off, a variation in power source voltage, a variation in current attributable to a change in load, and so on, it is often difficult to obtain accurately a power supply switching signal even though the power supply waveforms Uo, Vo and Wo are inputted to the filtering circuit. As a countermeasure, a system has been suggested such as disclosed in the Japanese Patent Publication No. 59-36519.

However, the system using the filtering circuit for providing the power supply switching signal from the power supply waveform for the driving coils basically has the following problem. That is, a voltage drop resulting from both the power supplied during the supply of electric power to the driving coils and the internal impedances of the driving coils, a spike noise occurring immediately after the interruption of the power supply, and so on, tend to be superimposed on a fundamental wave (counterelectromotive force) of the power supply waveforms of the driving coils. Such a voltage drop and spike constantly vary with a variation in power source voltage and load. Accordingly, where the power supply waveforms of the driving coils are filtered to provide the power supply switching signal, an error tends to occur as a result of the above described component, such as the voltage drop, spike, etc., which is superimposed on the fundamental wave (counterelectromotive force) of the power supply waveforms while the latter constantly vary, and it is therefore difficult to accurately supply the electric power to the driving coils.

In order to eliminate the above described conventional problems, various methods have been suggested to obtain the power supply switching signal accurately, all of which are basically characterized in that adjustment is effected in the periphery of the filtering circuit for maintaining at a constant value the difference in phase between the driving coil counterelectromotive force and the power supply switching signal. Such an adjustment is extremely cumbersome. Also, other than those necessary for the filtering circuit, a number of additional capacitors are required and, therefore, when the driving circuit is fabricated into an integrated circuit, both the number of component parts to be connected and the number of connection pins tend to increase, rendering the price high. Also, a system wherein no filtering circuit is employed and, instead, the use is made of, for example, a microcomputer for digitally providing the power supply switching signal is disclosed in the Japanese Laid-open Patent Publication No. 61-293191, which is relatively expensive.

As hereinbefore discussed, since the conventional drive device for the brushless motor is constructed so that the filtering circuit is used to process the power supply waveforms of the driving coils to provide the power supply switching signal having a predetermined phase relationship to the position of the movable element, the switching signal being utilized to sequentially energize the driving coils, it is not possible to obtain an accurate power supply switching signal because of a voltage drop in the driving coils resulting from the spike noises contained in the power supply waveforms of the driving coils and the electric current supplied, a variation of the superimposed component resulting from the change of the power source voltage and the load, the armature reaction and so on. Also, an increased number of capacitors having a high capacitance is required for constructing the filtering circuit and, in particular, when the driving circuit is to be fabricated in an integrated circuit, both the number of component parts to be connected and the number of connection pins tend to increase, rendering it disadvantageous in terms of price.

In view of the foregoing, a system such as disclosed in the Japanese Patent Publication No. 61-3193 is suggested wherein the counterelectromotive force generated in the driving coils is shaped as to its waveform and use is made of a phase sync loop (PLL) circuit to generate an appropriate phase pulse to permit the driving coils to be sequentially supplied with electric power to drive the motor. In other words, there is disclosed a system wherein, according to the construction shown in FIG. 19, counterelectromotive voltages A, B and C generated by the driving coils are pulse-shaped and arithmetically processed to provide a pulse signal G which is compared in phase with a divider output I provided at an output of a voltage controlled oscillator, a thus compared output being fed back to the voltage controlled oscillator to make the signals I and G to be matched in phase with each other so that the frequency division of the signal I can result in a generation of the power supply signal for the driving coils to thereby drive the motor. The behavior of the signals at various portions of this system are shown in FIG. 20. However, in such a system, a voltage drop resulting from the electric current supplied during the supply of the electric power to the driving coils and the internal impedances of the driving coils, the spike noises generated immediately after the interruption of the power supply, and so on, are superimposed on the counterelectromotive voltage generated in the driving coils as hereinbefore described and, therefore, it is extremely difficult to obtain the pulse signal by shaping and arithmetically processing the counterelectromotive force generated in the driving coils. In fact, with the construction shown in FIG. 19, it is not easy to obtain a pulse signal G as shown in FIG. 20 and the spike noise generated immediately after the power supply through the driving coils necessarily affects the operation. Accordingly, it is impossible to accomplish the phase comparison with the divider output I and, therefore, it is impossible to render the phases of the signals I and G to be matched with each other.

As hereinbefore discussed, the conventional drive devices for the brushless motor have had various problems.

SUMMARY OF THE INVENTION

Accordingly, the object of the present invention is to provide a drive device for a brushless motor wherein the necessity of the use of a number of capacitors having a high capacitance hitherto required in the conventional filtering circuit is eliminated and the sequential supply of an electric power through the driving coils is possible without being adversely affected by any possible effect brought about by spike noises contained in the power supply waveform for the driving coils, by a variation in power source voltage, by a variation in load and by an armature reaction.

The present invention includes a plurality of phases of motor driving coils; a plurality of driving transistors connected to the driving coils; a voltage controlled oscillator for outputting a signal having an appropriate frequency; a power supply switching circuit for forming a power supply switching signal for the driving coils on the basis of a frequency signal corresponding to the frequency of oscillation of the voltage controlled oscillator; and a phase difference detector having a comparator for generating a phase difference detecting pulse having a predetermined phase relationship with the power supply switching signal during a period in which no electric power is supplied to the driving coils, and also for comparing a counterelectromotive voltage generated in the driving signals with a neutral point voltage of the driving coils during a period in which the phase difference detecting pulse is generated, the phase difference detector being operable to detect an equivalent phase difference between the power supply switching signal and the counterelectromotive voltage in reference to an output from the comparator; and a difference amplifier for amplifying an output from the phase difference detector and for generating an output which is in turn applied to the voltage controlled oscillator.

Since this construction forms a feedback loop, that is, a phase controlled loop (PLL loop) wherein the phase difference between the counterelectromotive voltage generated in the motor driving coils and the power supply switching signals for the driving coils is detected so that the frequency and phase of the power supply switching signal can be controlled in dependence on the detected phase difference to thereby permit the power supply switching signal to exhibit a predetermined phase relationship with the position of the movable element, the use of the filtering circuit hitherto required can be dispensed with, and accordingly, all inconveniences brought about by the use of the filtering circuit can be advantageously eliminated.

Also, since the difference in phase between the counterelectromotive voltage generated in the motor driving coils and the power supply switching signal for the motor driving coils is detected during the interruption of the power supply, an accurate detection of the phase difference is possible and the phase controlled loop can be steadily operated.

Also, the present invention includes a plurality of phases of motor driving coils; a plurality of driving transistors connected to the driving coils; a power supply switching circuit for sequentially transmitting a power supply switching signal for the driving coils to the driving transistors; a reference signal generator for inputting a signal having an appropriate frequency to the power supply switching circuit; a phase difference detector for detecting a phase difference between the counterelectromotive voltage generated in the driving coils and the power supply switching signal for the driving coils during the interruption of the power supply to the driving coils; and a difference amplifier for amplifying an output from the phase difference detector, an output of said the difference amplifier being used as a torque commanding signal.

Since this construction forms a feedback loop, that is, a phase controlled loop wherein the phase difference between the counterelectromotive voltage generated in the motor driving coils and the power supply switching signal for the driving coils that is synchronized with an output from the reference signal generator is detected so that a motor driving torque can be controlled in dependence on the detected phase difference with the counterelectromotive voltage for the driving coils having a predetermined phase relationship with the output from the reference signal generator, a speed control and a drive of the brushless motor are possible without using the position detector for the movable element hitherto required and, therefore, the a brushless motor which is compact, low in price, high in reliability, and so, can be realized.

BEST MODE OF CARRYING OUT THE INVENTION

Hereinafter, a drive device for the brushless motor in one embodiment of the present invention will be described with reference to the drawings.

Figure 1:
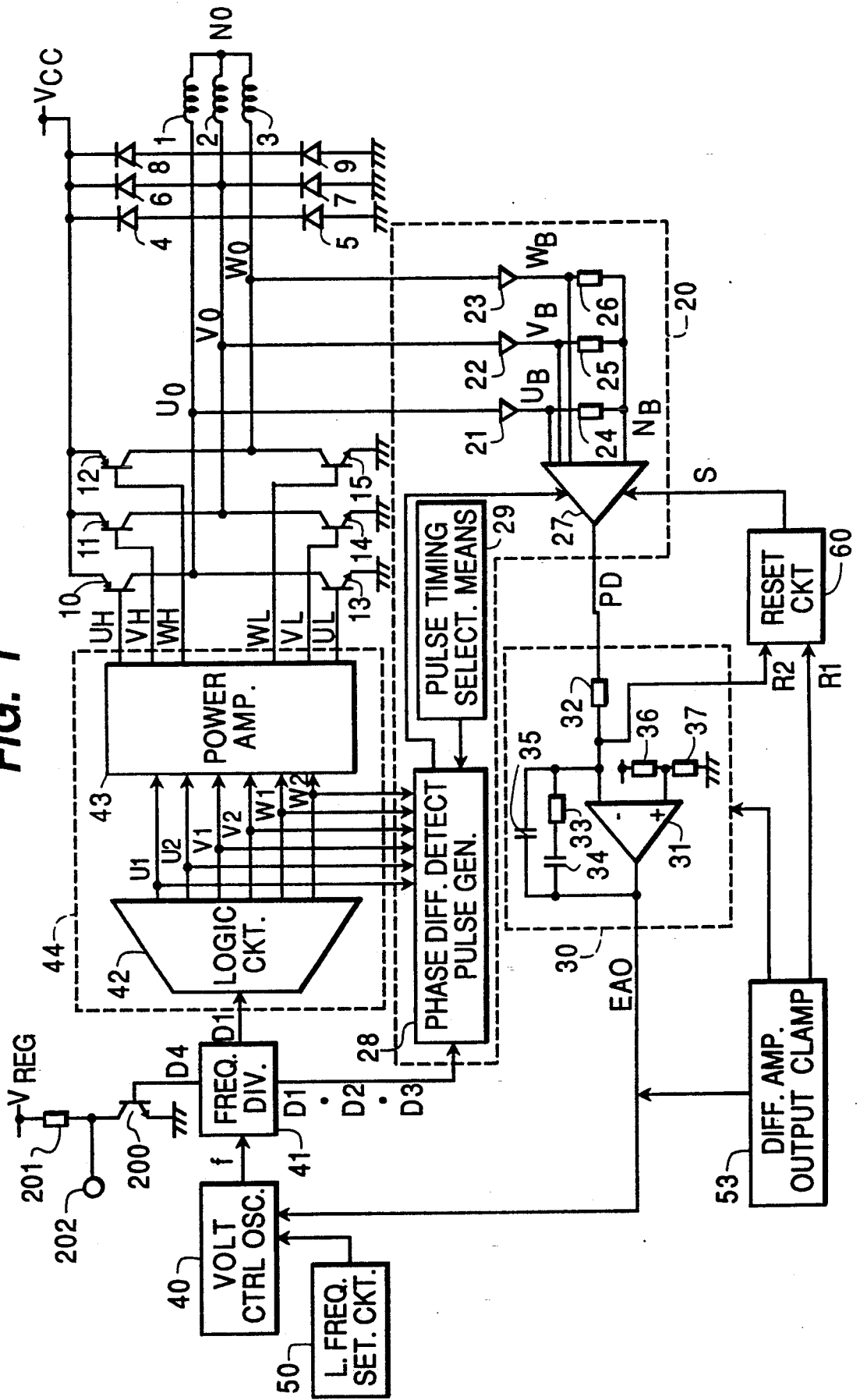
FIG. 1 is a circuit diagram showing a drive device for a brushless motor according to one embodiment of the present invention.
Figure 17:
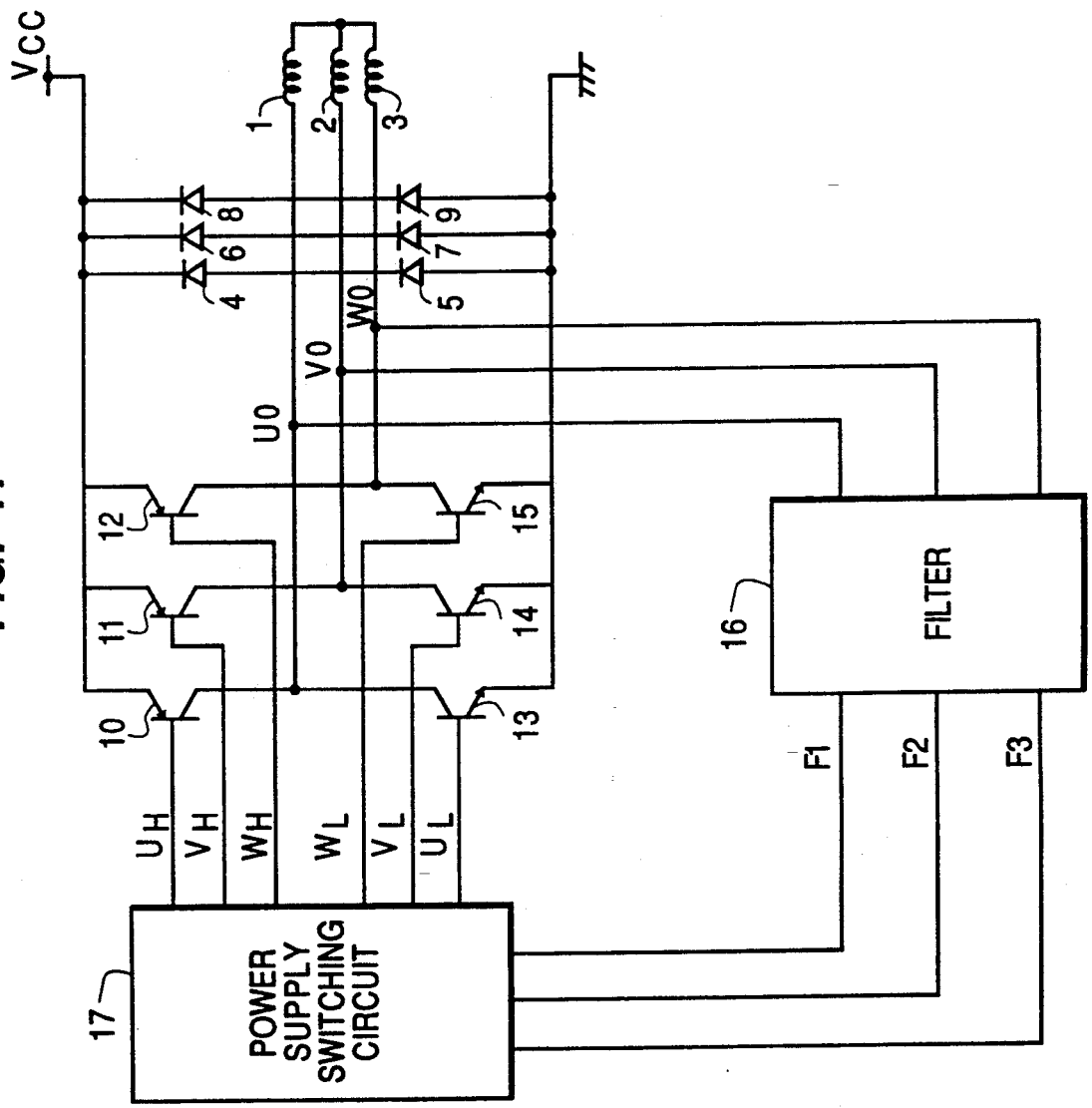
FIG. 17 is a circuit diagram of the conventional drive device for the brushless motor.
Figure 18:
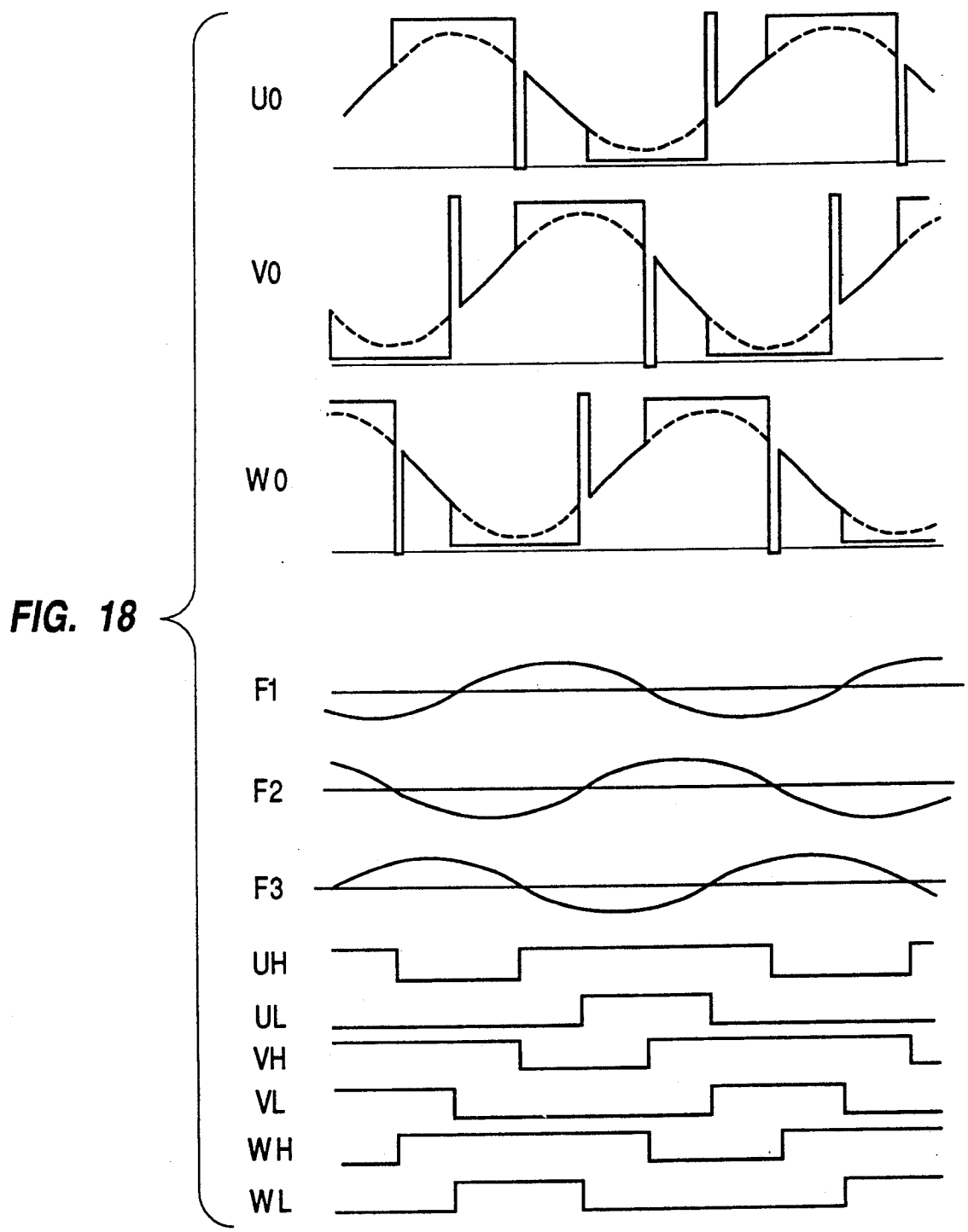
FIG. 18 is a diagram for explaining the operation of the conventional drive device for the brushless motor.
Figure 19:
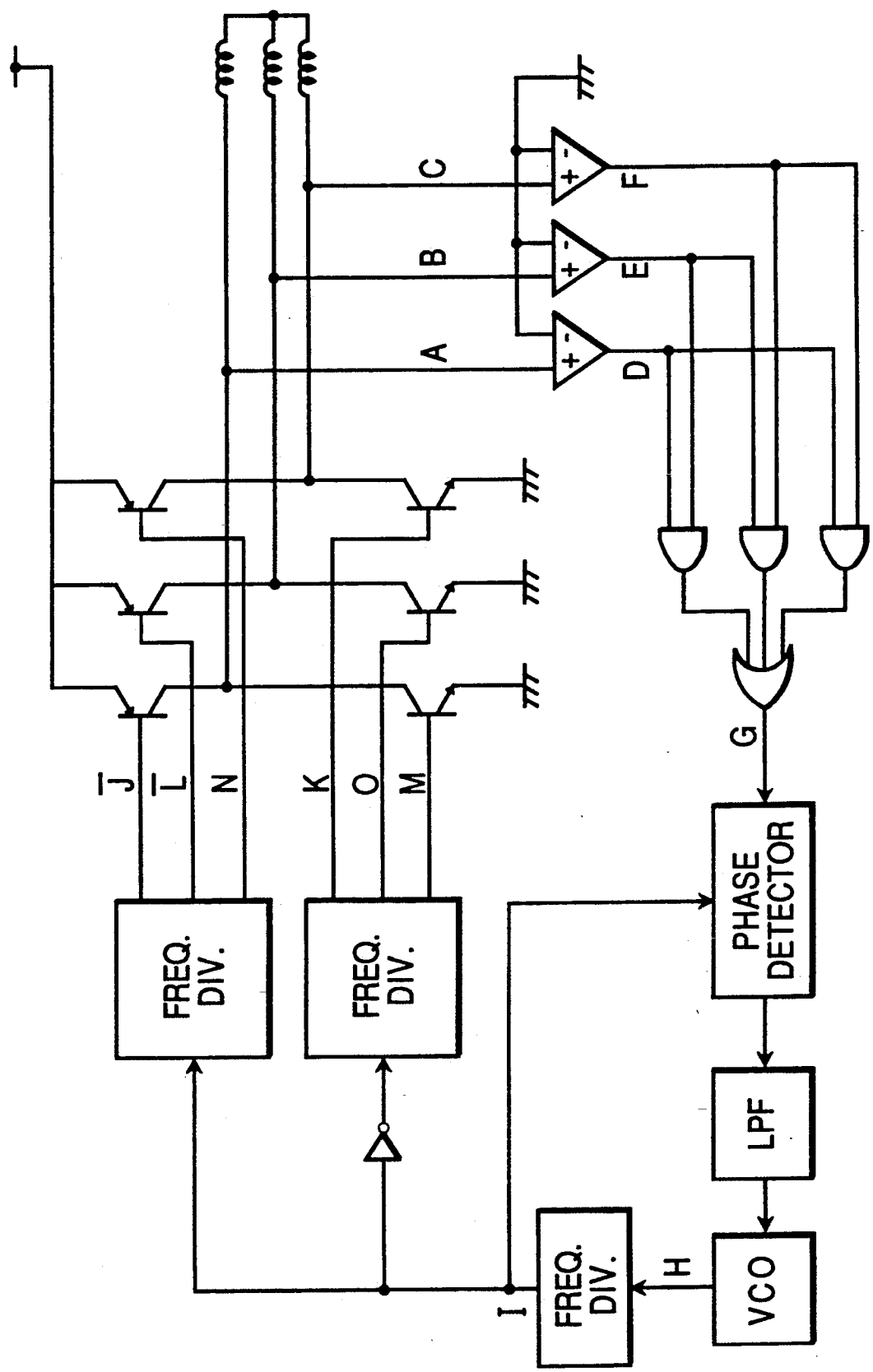
FIG. 19 is a circuit diagram showing a different conventional drive device for the brushless motor.
Figure 20:
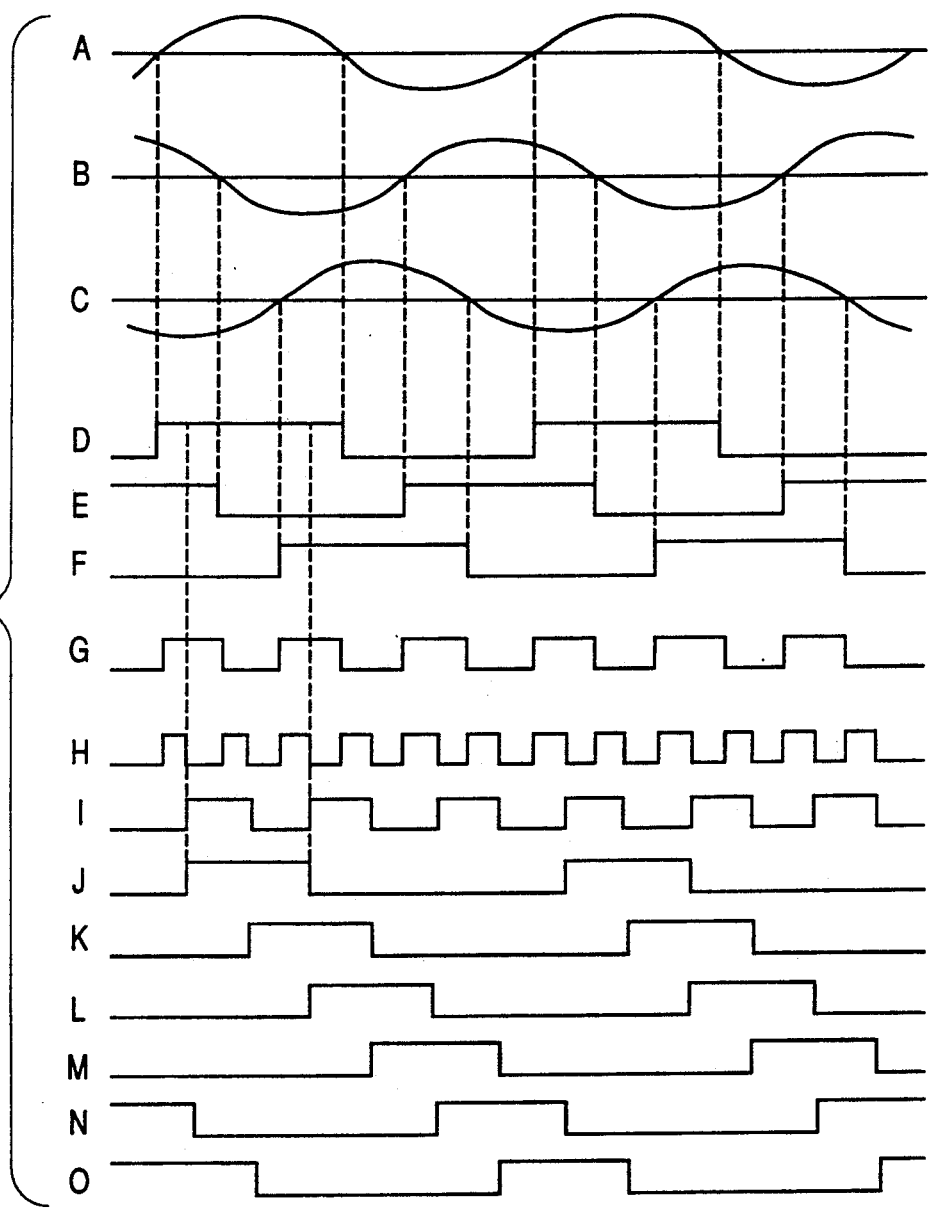
FIG. 20 is a diagram for explaining the operation of the circuit of FIG. 19.

FIG. 1 is a circuit diagram showing a drive device for a brushless motor according to one embodiment of the present invention. In FIG. 1, like reference numerals are employed to denote like parts which are identical in function with those of the conventional drive device for the brushless motor shown in FIG. 17 and, therefore, the details thereof will not be described. In FIG. 1, the respective bases of the driving transistors 10 to 15 are connected to outputs of a power amplifier 43 which has inputs connected to respective outputs of a logic circuit 42. The logic circuit 42 and the power amplifier 43 together constitute a power supply switching signal generator 44. The logic circuit 42 has an input connected to an output D1 of a frequency divider 41 which has an input connected with an output of a voltage controlled oscillator 40. To the voltage controlled oscillator 40 is connected a lowest frequency setting circuit 50. Outputs D1, D2 and D3 from the frequency divider 41 and outputs U1, U2, C1, V2, W1 and W2 from the logic circuit 42 are inputted to a phase difference detecting pulse generator 28, and ends Uo, Vo and Wo of the respective driving coils 1, 2 and 3 are inputted to buffer circuits 21, 22 and 23. Respective outputs $U_B$, $B_B$ and $W_B$ from the buffer circuits 21, 22 and 23 are inputted to a comparator 27 and are connected together through resistors 24, 25 and 26, a common junction $N_B$ being inputted to the comparator 27. An output PD of the comparator 27 is controlled by an output from the phase difference detecting pulse generator 28. The timing at which a phase difference detecting pulse is generated from the phase difference detecting pulse generator 28 is set by a pulse timing selecting circuit 29. It is noted that the various component parts 21 to 29 constitute a phase difference detector 20 while the output PD constitutes an output from the phase difference detector 20. The output PD from the phase difference detector 20 is connected to an inverting input terminal of an operational amplifier 31 through a resistor 32, and a series circuit of resistor 33 and capacitor 34 and a capacitor 35 are connected between the inverting input terminal of the operational amplifier 31 and an output terminal thereof. A non-inverting input terminal of the operational amplifier 31 is applied with a predetermined bias voltage from resistors 36 and 37. It is noted that the various component parts 31 to 37 constitute a difference amplifier 30 while an output EAO from the difference amplifier 30 is connected to an input of the voltage controlled oscillator 40.

Also, the difference amplifier 30 is connected to a difference amplifier output clamping circuit 53.

The inverting input terminal of the operational amplifier 31 and an output of the difference amplifier output clamping circuit 53 are inputted to a reset circuit 60 whose output is used to control the output PD of the comparator 27.

Another output D4 of the frequency divider 41 is inputted to the base of a transistor 200 having its emitter connected to ground and its collector connected to a stabilizing power source line through a resistor 201 and also to a speed signal output terminal 202.

The operation of the drive device for the brushless motor which is so constructed as hereinabove described will now be described.

Figure 2A:
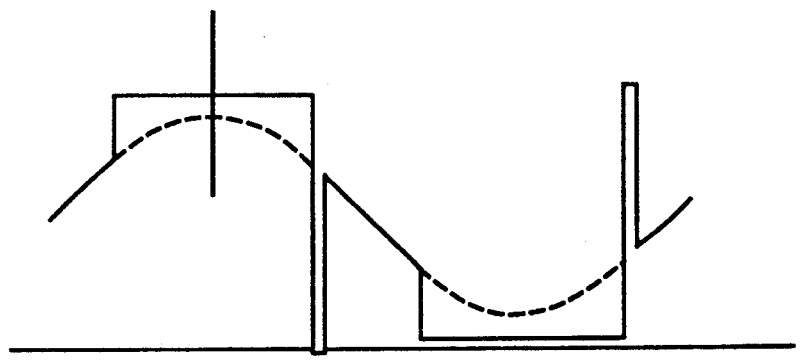
FIGS. 2A, 2B and 2C are explanatory diagrams for explaining the principle of operation of the circuit of FIG. 1.
Figure 2B:
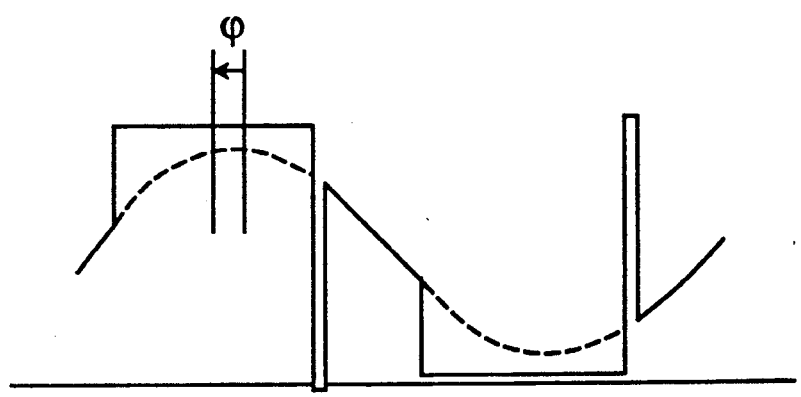
Figure 2C:
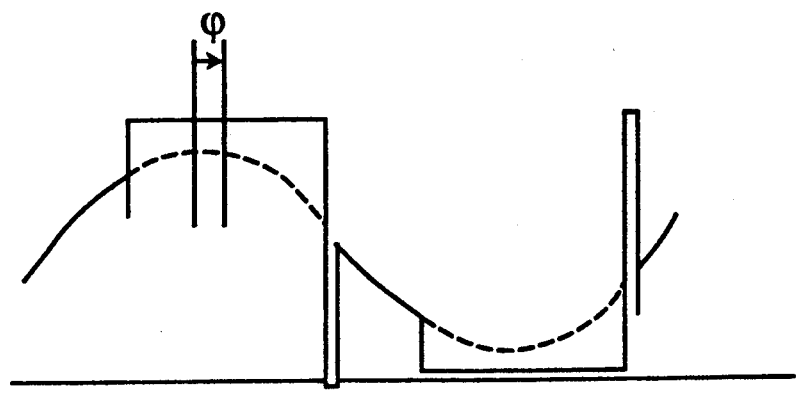

FIG. 2 is an explanatory diagram for explaining the principle of operation of the present invention, showing a phase relationship between a driving coil counterelectromotive voltage and a driving coil power supply waveform. FIG. 2(a) illustrates the case in which the phase relationship between the counterelectromotive voltage (dotted line) and the power supply waveform (solid line) is optimum, whereas FIGS. 2(b) and 2(c) illustrate the respective cases wherein a displacement of a phase angle $\psi$ occurs from the optimum condition. In FIG. 1, the output from the voltage controlled oscillator 40 is transmitted to the driving coils 1 to 3 through the frequency divider 41, the power supply switching circuit 44 and the driving transistors 10 to 15. Accordingly, the output from the voltage controlled oscillator 40 and the power supply waveforms for the driving coils 1 to 3 have a predetermined phase relationship. In other words, by controlling the oscillating frequency and phase of the voltage controlled oscillator 40, it is possible to control a difference in phase between the driving coil counterelectromotive voltage and the driving coil power supply waveform. In view of this, if a phase control loop is provided in which, where as shown in FIGS. 2(b) and 2(c) the displacement of the phase angle $\psi$ occurs between the driving coil counterelectromotive voltage and the driving coil power supply waveforms, the phase difference $\psi$ is detected by the phase difference detector 20 and then amplified by the difference amplifier 30 and the oscillating frequency and phase of the voltage controlled oscillator 40 can be controlled so as to render $\psi$ to become zero, it is possible to secure the optimum power supply condition shown in FIG. 2(a). Accordingly, it is possible to steadily and efficiently generate a motor driving torque and the motor is thus driven.

The specific construction of the phase difference detector 20 will now be described in detail.

Figure 3:
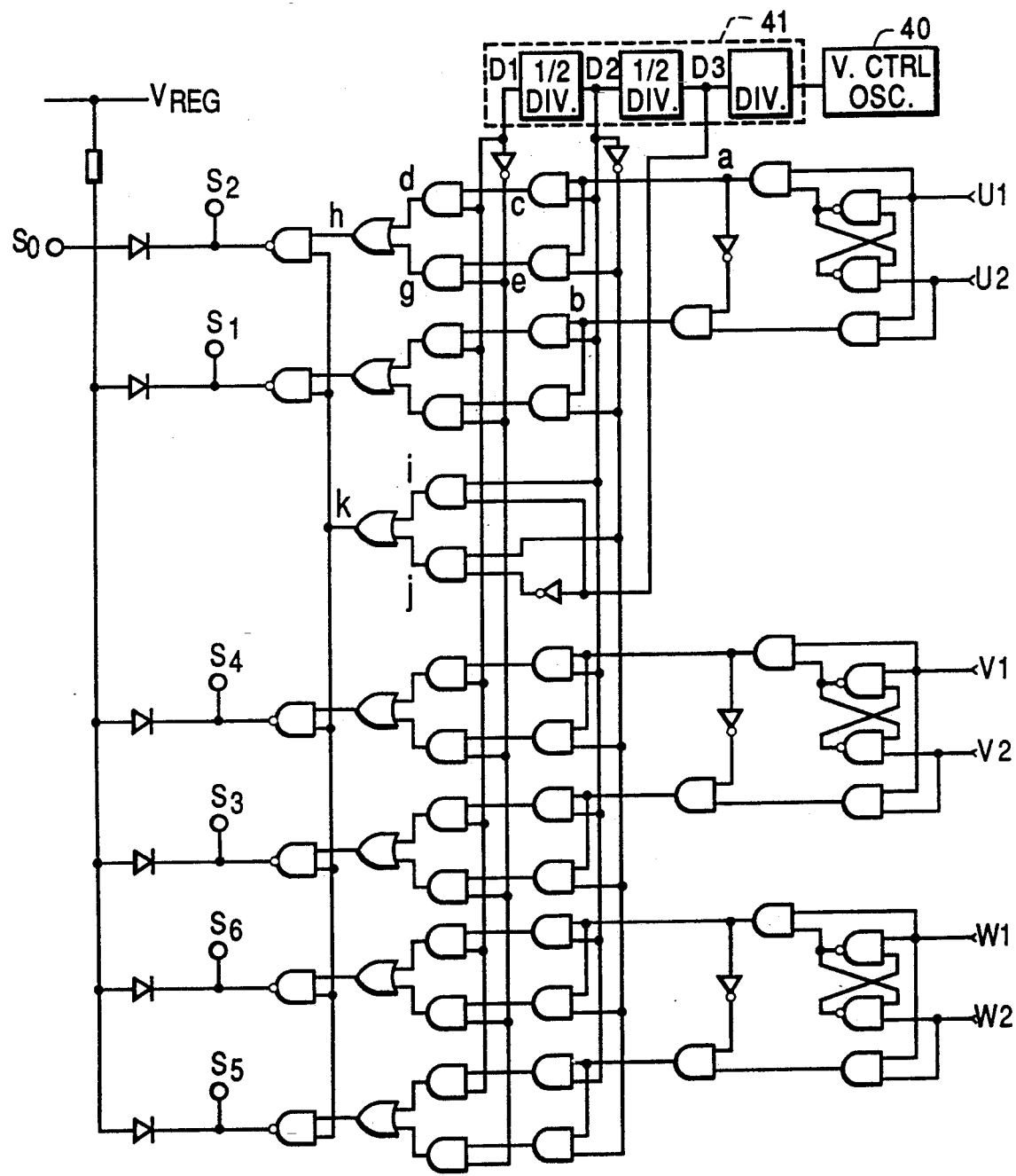
FIG. 3 is a detailed circuit diagram of a phase difference detecting pulse generator.
Figure 4:
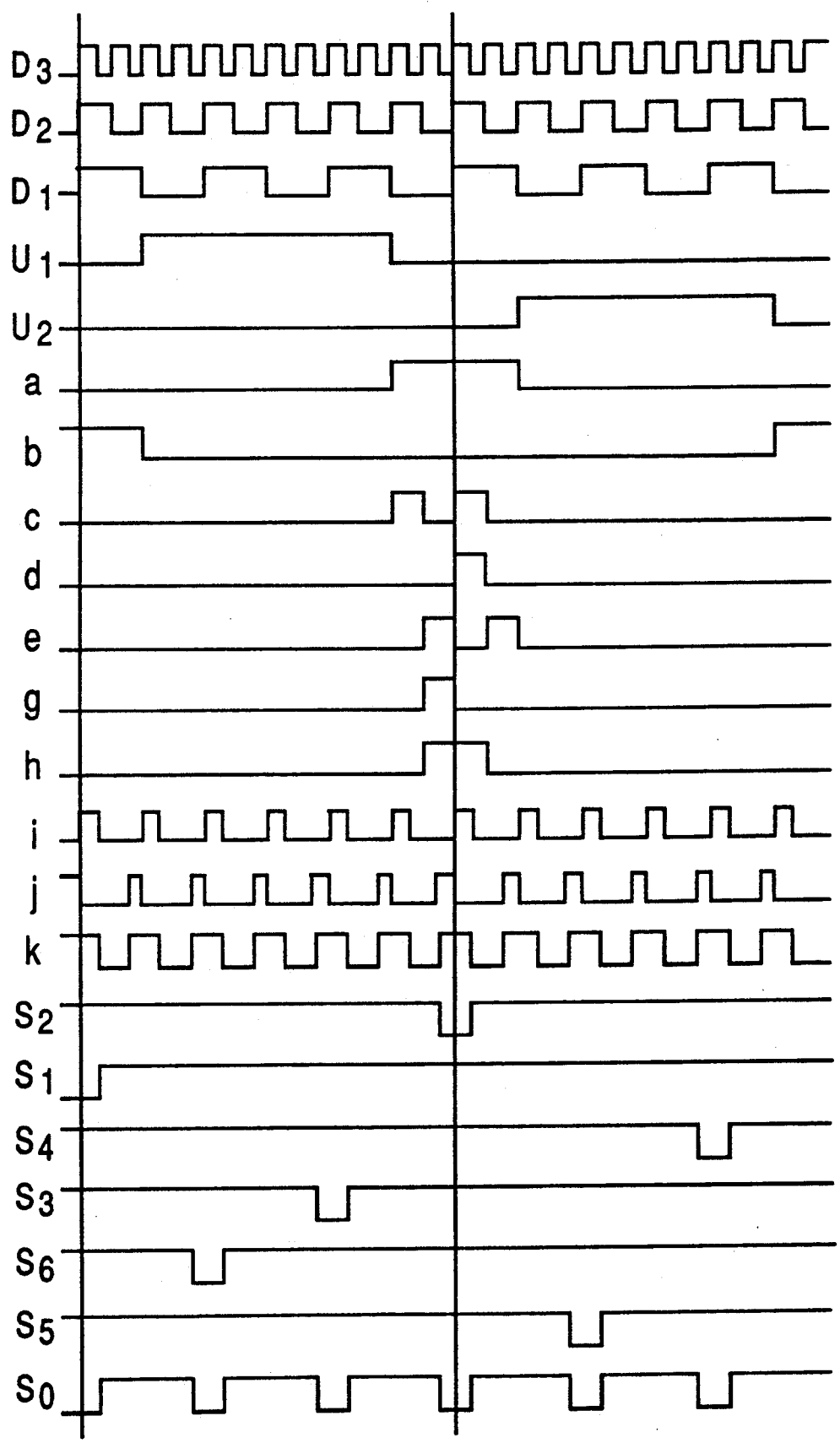
FIG. 4 is an explanatory diagram for explaining the operation of the circuit of FIG. 3.

Such a circuit as shown in FIG. 3 can be contemplated by way of example as a specific construction of the phase difference detecting pulse generator 28 in the phase difference detector 20. In FIG. 3, components which are similar in function to those shown in FIG. 1 are designated by like reference numerals. The outputs U1, U2, V1, V2, W1 and W2 of the logic circuit 42 and the outputs D1, D2 and D3 of the frequency divider 41 are applied to the phase difference detecting pulse generator as respective input signals. FIG. 4 is an explanatory diagram for use in explaining the operation of the phase difference detecting pulse generator shown in FIG. 3, wherein the waveforms shown in FIG. 4 correspond to those of signals appearing at respective points shown by associated symbols in FIG. 3. Output terminals S0, S1, S2, S3, S4, S5 and S6 of the phase difference detecting pulse generator 28 provide respective signal waveforms designated in FIG. 4 by the same symbols as used in FIG. 3.

Figure 5:
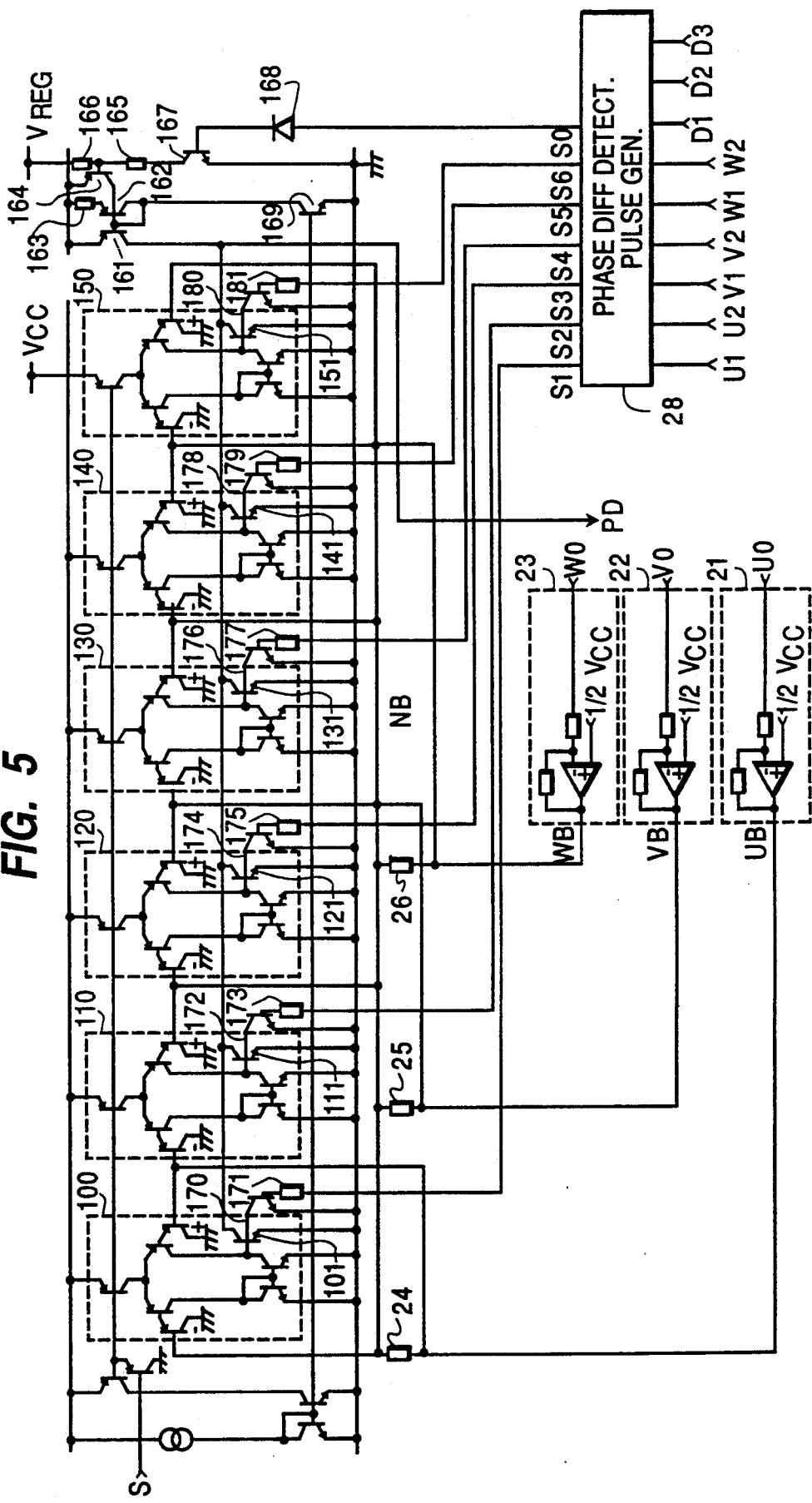
FIG. 5 is a detailed circuit diagram of a phase difference detector.

Then, as a specific construction of the phase difference detector 20 including the phase difference detecting pulse generator 28, such a circuit as shown in FIG. 5 can be contemplated by way of example. In FIG. 5, components which are similar in function to those shown in FIG. 1 are designated by like reference numerals. Specifically, ends Uo, Vo and Wo of the driving coils 1, 2 and 3 are inputted to the respective buffer circuits 21, 22 and 23 which have their outputs $U_B$, $V_B$ and $W_B$ connected together at the common junction $N_B$ which is in turn is connected to inverting input terminals of comparators 100, 120 and 140 and non-inverting input terminals of comparators 110, 130 and 150. The output $U_B$ of the buffer circuit 21 is connected to a non-inverting input terminal of the comparator 100 and an inverting input terminal of the comparator 110; the output $V_B$ of the buffer circuit 22 is connected to a non-inverting input terminal of the comparator 120 and an inverting input terminal of the comparator 130; and the output $W_B$ of the buffer circuit 23 is connected to a non-inverting input terminal of the comparator 140 and an inverting input terminal of the comparator 150. Outputs from the comparators 100, 110, 120, 130, 140, and 150 the collector outputs from respective output transistors 101, 111, 121, 131, 141 and 151 are connected together and are in turn connected to a collector of a transistor 161, thereby constituting a phase difference detector output PD. The base of the transistor 161 is connected to the base and collector of a transistor 162 and also to the collector of a transistor 164 and the collector of a transistor 169 which operates as a constant current source. The emitter of the transistor 162 is applied with a stabilizing power source voltage Vreg through a resistor 163 and the emitters of the transistors 161 and 164 are applied with the stabilizing power source voltage Vreg. The base of the transistor 164 is connected to the emitter thereof through a resistor 166 and also through a resistor 165 with the collector of a transistor 167 whose emitter is grounded. The base of the transistor 167 is connected through a diode 168 with an output S0 of the phase difference detecting pulse generator 28. Other outputs S1, S2, S3, S4, S5 and S6 of the phase difference detecting pulse generator 28 are connected through resistors 171, 173, 175, 177, 179 and 181 with the bases of emitter-grounded transistors 170, 172, 174, 176, 178 and 180, respectively, and the collectors of the transistors 170, 172, 174, 176, 178 and 180 are connected with the bases of the transistors 101, 111, 121, 131, 141 and 151, respectively. Input terminals of the phase difference detecting pulse generator 28 are connected with the outputs U1, U2, V1, V2, W1 and W2 of the power supply switching circuit 44 and the outputs D1, D2 and D3 of the frequency divider 41.

With respect to the phase difference comparator so constructed as hereinabove described, the operation thereof will be described hereinafter.

Figure 6:
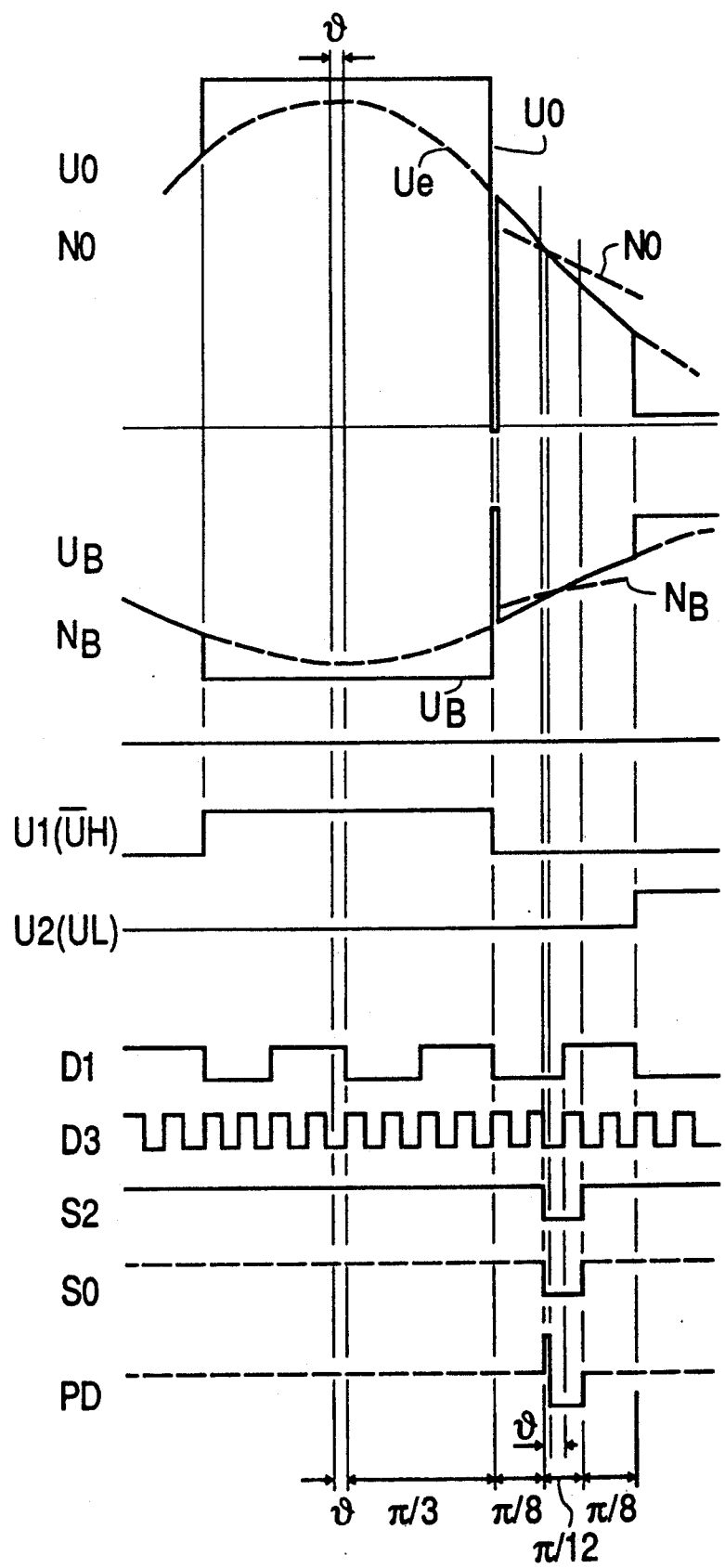
FIG. 6 is an explanatory diagram for explaining the operation of the circuit of FIG. 5.

FIG. 6 is an explanatory diagram for explaining the operation of the phase difference comparator and illustrates how the phase difference between the counterelectromotive voltage and the power supply waveform is detected as far as the driving coil 1 is concerned. In FIG. 6, the driving coil 1 is supplied with signals U1 and U2 (that is, $U_H$ and $U_L$), as power supply commanding signals, which are synchronized with D1 and D3 which are frequency-divided outputs of the voltage controlled oscillator 40. Accordingly, a period during which both of U1 and U2 are not outputted is a power supply interrupting period and, during this period, the driving coil power supply waveform Uo coincides with the counterelectromotive voltage Ue. From FIG. 6, the power supply interrupting period corresponds to a period from the time at which U2 is rendered to be Low to the time at which U1 is rendered to be High and corresponds to one clock of D1 or four clock periods of D3. Although there exists the power supply interrupting period even during a period from the time at which U2 is rendered to be Low to the time at which U1 is rendered to be High, only the former period will be taken into consideration for the purpose of simplification of the description. During the power supply interrupting period, comparing a neutral point voltage No of each driving coil with the driving coil power supply waveform Uo, when the phase difference $\psi$ between Uo and the driving coil counterelectromotive voltage Ue is zero, No and Uo coincide with each other during the two clock periods of D3 subsequent to the time at which the center, that is, U1 is rendered to be Low during the power supply interrupting period. Also, where Uo is delayed a phase difference $\psi$ relative to Ue, No and Uo coincide with each other before 2 clock periods of D3 passes subsequent to the time at which U1 is rendered to be Low, and, where Uo is advanced a phase difference $\psi$ relative to Ue, No and Uo coincide with each other after two clock periods of D3 subsequent to the time at which U1 is rendered to be Low. Accordingly, by comparing Uo and No with each other during two clock periods of D3 subsequent to the time at which U1 become Low, the phase relationship between Uo and Ue can be ascertained. Therefore, as a method for the detection of the comparator output PD having a duty corresponding to the phase difference $\psi$ can be obtained by generating phase difference detecting pulse signals S2 and S0 having an appropriate width at a timing two clock periods of D3 subsequent to the time at which U1 becomes Low and then by comparing No and Uo with each other only when S2 and S0 are generated. In FIG. 6, there is shown the case in which a period of ±0.5 clock period of D3 is generated two clock periods of D3 subsequent to the time at which U1 becomes Low and Uo is delayed relative to Ue by the phase angle $\psi$.

Although, in the foregoing, with respect to the detection of the phase difference $\psi$ utilizing the power supply interrupting period of the power supply waveform Uo for the driving coil 1 from the timing at which U1 becomes Low to the timing at which U2 becomes High, the principle of operation thereof has been described, a similar detection is also possible during the other power supply interrupting period relative to Uo, that is, the period from the timing at which U2 becomes Low to the timing at which U1 becomes High, as well as in the power supply waveforms Vo and Wo of the other driving coils 2 and 3 and, therefore, in the illustrated embodiment, all of them are combined to provide the phase difference detector output PD.

Also, each of the buffer circuits 21, 22 and 23 is an inverting amplifier having a half ($\frac{1}{2}$) gain and arrangement is made so as to permit the outputs $U_B$, $V_B$ and $W_B$ of the respective buffer circuits 21, 22 and 23 to fall within an operating input voltage range of each of the comparators 100, 110, 120, 130, 140 and 150.

Figure 7:
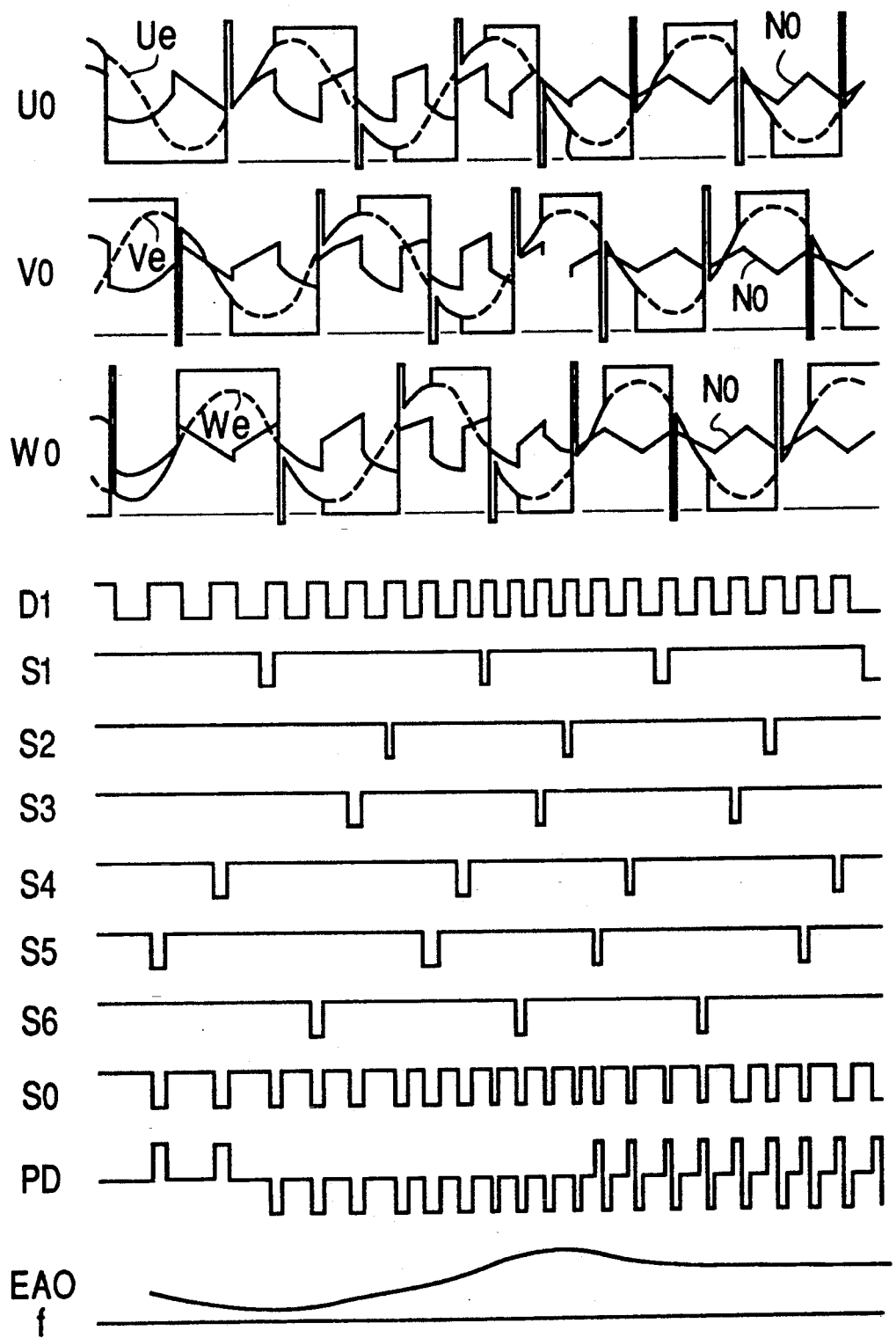
FIG. 7 is a diagram showing operative waveforms in one embodiment of the present invention.

FIG. 7 shows operating waveforms at various portions in the case where the phase difference detector 20 employed in FIG. 1 is of the construction shown in FIG. 5, illustrating the manner in which the oscillating frequency f of the voltage controlled oscillator 40 is controlled so as to render the phase difference between the driving coil power supply waveform and the counterelectromotive voltage to be zero.

Hereinafter, the lowest frequency setting circuit 50 shown in FIG. 1 will be described. The lowest frequency setting circuit 50 is operable to set the oscillating frequency of the voltage controlled oscillator 40 to the lowest frequency at the time of starting the motor so that a revolving magnetic field of a speed sufficient to permit the movable element to follow can be generated to assure the start of the motor. If the counterelectromotive voltage is generated in the motor driving coils as a result of the start of the motor, it is drawn into the previously described phase control loop and the motor is driven.

Figure 8:
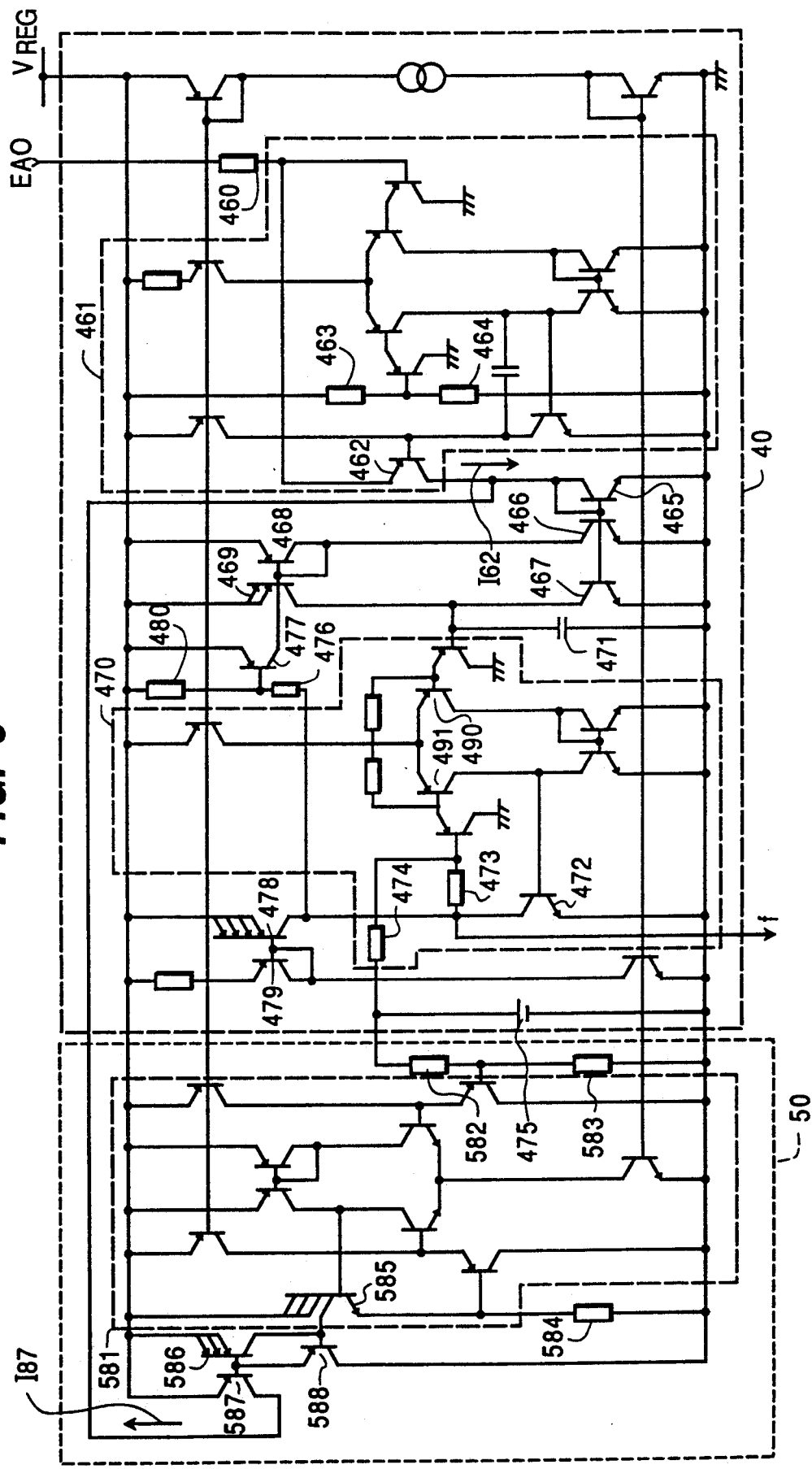
FIG. 8 is a detailed circuit diagram of a voltage controlled oscillator and a lowest frequency setting circuit.

As a specific construction of each of the voltage controlled oscillator 40 and the lowest frequency setting circuit 50, such a circuit as shown in FIG. 8 as a contemplated example. In FIG. 8, reference numeral 40 represents the voltage controlled oscillator and reference numeral 50 represents the lowest frequency setting circuit. In FIG. 8, the output EAO of the difference amplifier 30 is connected to one input terminal of a differential amplifier 461 through a resistor 460 and also to the emitter of a transistor 462. Another input terminal of the differential amplifier 461 is connected to a dividing point of a voltage divider comprised of resistors 463 and 464 connected between the stabilizing power source line and ground. A difference between the two inputs of the differential amplifier 461 is amplified and inputted to the base of the transistor 462. The collector of the transistor 462 is connected to the collector and base of a transistor 465. The transistors 465 and transistors 466 and 467 have their bases connected together and their emitters grounded to provide a current mirror circuit. Transistors 468 and 469 whose emitters are connected with the stabilizing power source line have their bases connected together and also to the collectors of the respective transistors 468 and 466. The collector of the transistor 468 is connected to the collector of the transistor 467 and also to one input terminal of a comparator 470. A capacitor 471 is connected between this one input terminal of the comparator 470 and ground. A resistor 473 is connected between the collector of an output transistor 472 of the comparator 470 and the other input terminal of the comparator 470. A terminal of the resistor 473 adjacent this other input terminal of the comparator 470 is connected to a bias power source 475 through a resistor 474. The collector of the transistor 472 is connected to the collector of a transistor 478 for providing a constant current and also with the base of a transistor 477 through a resistor 476. The emitter of the transistor 477 is connected to the stabilizing power source line and a resistor 480 is connected between the base and the emitter thereof, the collector being connected to a common junction between the respective bases of the transistors 468 and 469.

The voltage of the bias power source 475 is divided by the dividing circuit comprised of resistors 582 and 583, the voltage dividing point being connected to one input terminal of a differential amplifier 581 while the emitter of an output transistor 585 of the differential amplifier 581 is connected to ground through a resistor 584 and also to another input terminal of the differential amplifier 581. The transistor 585 is of a multi-collector type and $\frac{1}{4}$ of the collectors of the transistor 585 is connected to the base of a collector-grounded transistor 588 and also to the collector of a transistor 586. The base of the transistor 586 is connected to the base of a transistor 587 and also to the emitter of the transistor 588. The respective emitters of the transistors 586 and 587 are connected to the stabilizing power source line. The collector of the transistor 587 is connected to the collector of the transistor 462.

With respect to the voltage controlled oscillator 40 and the lowest frequency setting circuit 50 which are so constructed as hereinabove described, the operation thereof will now be described.

Assuming that in the difference amplifier 30 of FIG. 1 a voltage divider comprised of resistors 36 and 37 is connected between the stabilizing power source Vreg and ground and that the resistors 36 and 37 are of equal resistance, the voltage value of the output EAO of the difference amplifier 30 immediately after the power has been turned on will be Vreg/2. Also, assuming that in the voltage controlled oscillator 40 of FIG. 8 the resistors 463 and 464 connected to the input terminal of the differential amplifier 461 are of equal resistance, since the voltage value at the input terminal is Vreg/2, the voltage value at the junction between another input terminal of the differential amplifier 461 and the emitter of the transistor 462 will be Vreg/2. Accordingly, immediately after the power has been turned on, no voltage drop occur across the resistor 460. In other words, no current flow through the transistor 462.

Now, the lowest frequency setting circuit 50 will be described. Assuming that the voltage value of the bias power source 475 is $V_{75}$ and the respective resistances of the resistors 582, 583 and 584 are $R_{82}$, $R_{83}$ and $R_{84}$, the voltage value at one input terminal of the differential amplifier 581 will be $V_{75}.R_{83}/(R_{82}+R_{83})$. Since the other input terminal of the differential amplifier 581 is in a condition to establish an imaginal shortcircuit with such the one input terminal, the junction between such other input terminal and the emitter of the transistor 585 is equal to the voltage value $V_{75}.R_{83}/(R_{82}+R_{83})$ at the one input terminal. Accordingly, the emitter current of the transistor 586 will be $V_{75}.R_{83}/\{R_{84}.(R_{83}+R_{83})\}$. By way of the multi-collector construction of the transistor 585 and the current mirror constituted by the transistors 586 and 587, 1/12 of the emitter current of the transistor 585, that is, $V_{75}.R_{83}/\{12.R_{84}.(R_{82}+R_{83})\}$, is supplied to the voltage controlled oscillator 40 as a collector current $I_{87}$ of the transistor 587 to set it to the lowest frequency.

Hereinafter, how the oscillating frequency of the voltage controlled oscillator 40 is determined will now be described. When no charge is present on the capacitor 471 connected between one input terminal of the comparator 470 and ground, the transistors 490 and 491 are switched on and off, respectively, and accordingly, the output transistor 472 of the comparator 47 is switched off which in turn causes the transistor 477 to be switched off with the consequence being that the current mirror circuit comprised of the transistor 468 and 469 is operated. The current mirror circuit comprised of the transistors 465, 466 and 467 is operated on the basis of the current flowing through the transistor 465. Accordingly, the capacitor 471 is charged by a current corresponding to the difference between the collector current of the transistor 469 and the collector current of the transistor 467. At this time, the voltage Vj at the other input terminal of the comparator 470 is equal to the value shown by the following equation if a saturated voltage between the emitter and the collector of the transistor 478 is neglected.

$$Vj = V_{75} + R_{74}.(Vreg - V_{75})/(R_{73}+R_{74})$$

wherein Vreg represents the voltage of the stabilizing power source and $R_{73}$ and $R_{74}$ represent respective resistances of the resistors 473 and 474. When, with the progress of the charging on the capacitor 471, the voltage across the capacitor 471, that is, the voltage at one input terminal of the comparator 470, increases to a value higher than the voltage Vj, the transistors 490 and 491 are switched off and on, respectively, and accordingly, the transistor 472 is switched on which in turn causes the transistor 477 to be switched on, with the consequence being that the current mirror circuit comprised of the transistors 468 and 469 is switched off. Therefore, the capacitor 471 is charged by the collector current of the transistor 467. At this time, the voltage Vk at the other input terminal of the comparator 470 is of a value equal to $V_{75}.R_{73}/(R_{73}+R_{74})$ if the saturated voltage between the emitter and the collector of the transistor 472 is neglected. When, with the progress of the charging on the capacitor 471, the voltage across the capacitor 471, that is, the voltage at one input terminal of the comparator 470, decreases to a value lower than the voltage Vk, the comparator 470 is inverted and the charging on the capacitor 471 is again initiated. By repeating the cycle of charging and discharging of the capacitor 471 in this way, an oscillating waveform of a frequency corresponding to the cycle of repeated charging and discharging can be outputted from the collector of the output transistor 472 of the comparator 470.

The oscillating frequency is determined by the magnitude of the charging and discharging current of the capacitor 471 since the voltages Vj and Vk are constant. In other words, when the charging and discharging current increase, the voltage across the capacitor 471 sets up and, since the set-up tends to become steep, the oscillating frequency becomes high and, conversely, when the charging and discharging current decreases, the oscillating frequency becomes low. On the other hand, the magnitude of the charging and discharging current is determined on the basis of the current flowing through the transistor 465. Also, the current flowing through the transistor 465 corresponds to the sum of the collector current $I_{87}$ of the output transistor 587 of the lowest frequency setting circuit 50 and the collector current $I_{62}$ of the output transistor 462 of the differential amplifier 461.

Since, as hereinbefore described, the collector current $I_{62}$ of the transistor 462 is zero immediately after the power has been turned on, the current flowing through the transistor 465 is equal to the current $I_{87}$ from the lowest frequency setting circuit 50. Accordingly, the oscillating frequency of the voltage controlled oscillator 40 starts its oscillation at the lowest frequency determined by the current $I_{87}$. If this lowest frequency is adjusted to a value which is sufficient to permit the movable element of the motor to follow sufficiently, it is possible to assuredly start the motor as a synchronous motor synchronized with a frequency corresponding to the lowest frequency. For this purpose, the lowest frequency can be adjusted by rendering the resistance of the resistor 584 to be variable to vary the current $I_{87}$. Once the motor is started, the counter-electromotive voltage is generated in the motor driving coil. Then, the phase difference between the counter-electromotive voltage and the power supply switching signal for the driving coils during the power supply interrupting period of the driving coils is detected by the phase difference detector 20, and a direct current voltage corresponding to the phase difference so detected is generated at the output EAO of the difference amplifier 30. Since the direct current voltage is applied to one end of the resistor 460 and, on the other hand, the other end of the resistor 460 is maintained at Vreg/2 as hereinbefore described, a current corresponding to the difference between the voltages at the opposite ends of the resistor 460 flows through the transistor 462. Accordingly, a current equal to the sum of the current $I_{87}$ from the lowest frequency setting circuit 50 and the collector current $I_{62}$ of the transistor 462 flows through the transistor 465 and, therefore, the oscillating frequency of the voltage controlled oscillator 40 increases. In this way, in response to the difference in phase between the counterelectromotive voltage in the driving coils and the power supply switching signal, the output EAO of the difference amplifier 30 varies to control the oscillating frequency of the voltage controlled oscillator 40.

The difference amplifier output clamping circuit 53 shown in FIG. 1 will now be described.

The difference amplifier output clamping circuit 53 is operable to clamp the output from the difference amplifier 30 to speed up the phase-synchronized pull of the phase controlled loop at the time of starting the motor. In other words, by clamping and holding the output EAO of the difference amplifier 30 at a level at which the oscillating frequency of the voltage controlled oscillator 40 starts its increase, it is possible to smoothly transmit a change in output PD of the phase difference detector 20 as a change in oscillating frequency f of the voltage controlled oscillator during a period from the start to the standing and, accordingly, the phase-synchronized pull of the phase controlled loop can be speeded up with the motor consequently driven.

Figure 9:
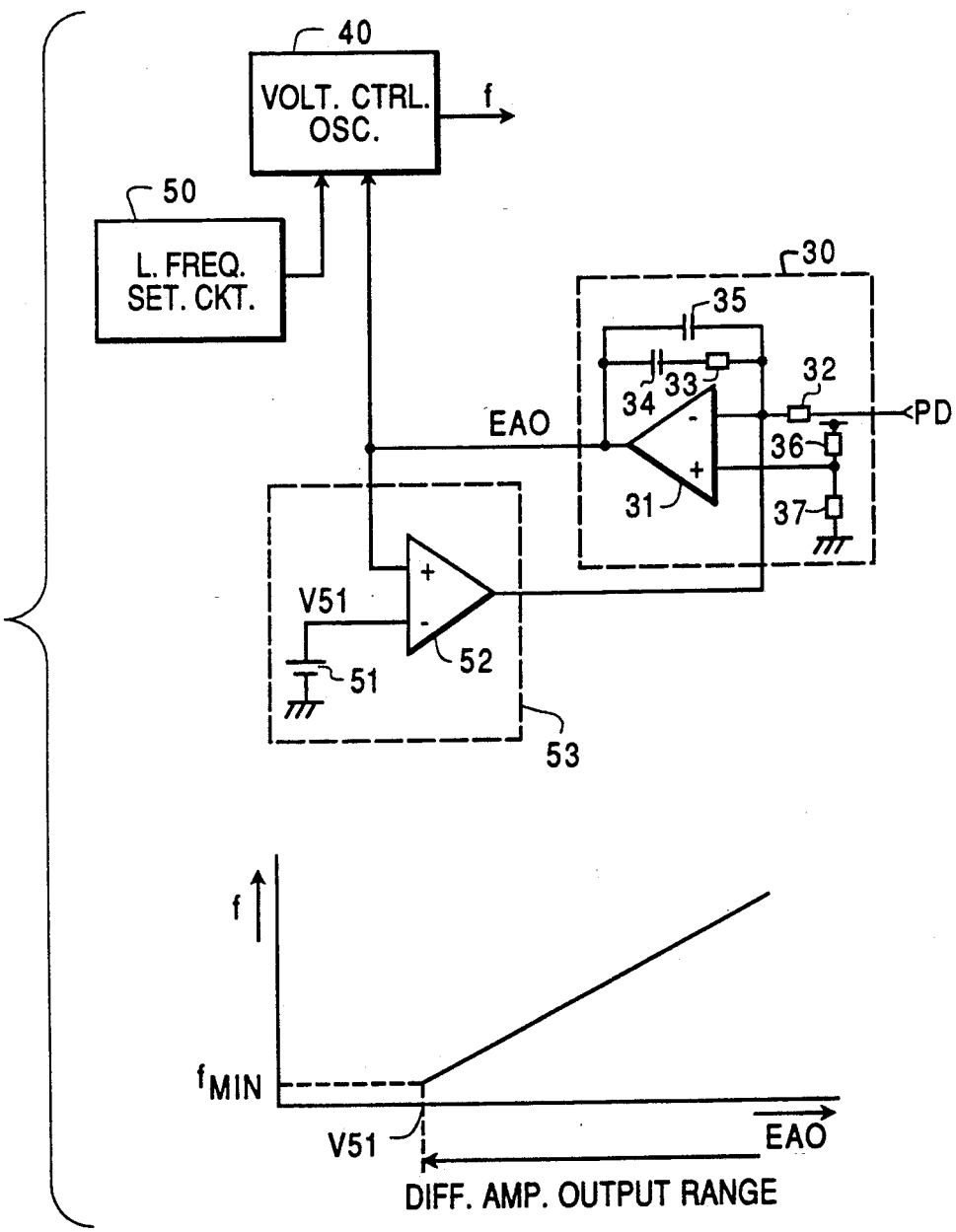
FIG. 9 is a detailed circuit diagram of a difference amplifier and a difference amplifier output clamping circuit.

As a specific construction of the difference amplifier output clamping circuit 53, such a circuit as shown in FIG. 9(a) is contemplated. Referring now to FIG. 9(a), a reference power source 51 operates as a level clamp for the output EAO of the difference amplifier 30; a comparator 52 compares the output EAO of the difference amplifier 30 with an output $V_{51}$ of the reference power source 51 for detecting a drop of the output EAO down to the level of $V_{51}$ so that an inverting input of the operational amplifier 31 can be controlled to avoid the drop of EAO down to a level lower than the level of $V_{51}$. Thereby, the drop level of EAO can be restricted to the level of $V_{51}$. The level of $V_{51}$ is the level at which the oscillating frequency f of the voltage controlled oscillator 40 starts its increase and, when EAO is clamped at $V_{51}$, f is equal to the frequency fmin set by the lowest frequency setting circuit. However, f starts its increase when EAO is slightly higher than $V_{51}$. By clamping, that is, holding, the EAO output at such a level $V_{51}$, it is possible to transmit the change of the output PD at the start as the change of f and, the quick synchronized pull (to establish a synchronized condition) of the phase controlled loop is possible.

It is noted that, although the clamping level for EAO has been set to be $V_{51}$, the clamping may be effected about $V_{51}-\Delta V$ ($\Delta V$=some dozen mV) in consideration of offsets and others of various circuit components.

The relationship between the output EAO and the oscillating frequency f is shown in FIG. 9(b).

In FIG. 9(b), $V_{51}$ represents the clamping level at which the output EAO is clamped, and fmin represents the lowest oscillating frequency by the lowest frequency setting circuit.

The pulse timing selecting circuit 29 shown in FIG. 1 will be hereinafter described.

In the circuit construction of the driving device for the brushless motor according to the embodiment of the present invention shown in FIG. 1, it is assumed that the bias at the non-inverting input terminal of the difference amplifier 30 is set to Vreg/2. During a condition in which the output from the difference amplifier 30 is not saturated and the phase controlled loop is operating steadily, the inverting input terminal of the difference amplifier 30 is similarly Vreg/2 since it is in a condition to establish an imaginary shortcircuit with the non-inverting input terminal thereof. The output PD of the phase difference detector shown in FIG. 5 represents such a waveform as shown by PD in FIG. 6, that is, a waveform which operates at a High level being Vreg and a Low level being zero. Under the condition in which the phase controlled loop is operating steadily, the PD waveform shown therein is controlled to represent a pulse waveform having an average voltage of Vreg/2, that is, a duty ratio of 50% High level and 50% Low level. However, during the power supply interrupting period, comparing the neutral point voltage No with the driving coil power supply waveform Uo, the point of intersection between No and Uo when the phase difference $\psi$ between Uo and the driving coil counterelectromotive voltage Ue is zero coincides at the center of the power supply interrupting period, that is, 2 clock periods of D3 subsequent to the time at which U1 becomes Low and, therefore, in reference to the time 2 clock periods of D3 subsequent to the time at which U1 becomes Low, the phase difference detecting pulses S2 and S0 are generated during a ±0.5 clock period and, during this period, Uo and No are compared so that the duty of PD can be determined depending on the relationship in magnitude between Uo and No. Accordingly, the duty will become 50% High level and 50% Low level and, therefore, the phase controlled loop can be stabilized. In other words, it is possible for the phase controlled loop to operate in a stabilized manner when the phase difference $\psi$ between Ue and Uo is zero.

On the other hand, while the foregoing is based on the fact that the point of intersect between No and Uo during the power supply interrupting period lies intermediate of such a period, it is assumed that the point of intersection between No and Uo deviate from the point intermediate of the power supply interrupting period as a result of the occurrence of a distortion in the driving coil power supply waveform Uo, that is, the counterelectromotive voltage waveform Ue by reason of, for example, the relationship in gaussing pattern of a rotary magnet. In such a case, if as is the foregoing case the phase difference detecting pulses S2 and S0 are generated during ±0.5 clock period at a timing 2 clock periods of D3 subsequent to the time at which U1 becomes Low and comparison is made between Uo and No during such a period, the duty of the PD waveform deviates from the condition of 50% High level and 50% Low level and, therefore, a feedback is effected to the input of the voltage controlled oscillator 40 through the difference amplifier 30 for the purpose of compensating for the deviation. As a result thereof, in the form as having a phase difference corresponding to the above described deviation between Ue and Uo the duty of the PD waveform will become 50% High level and 50% Low level and the phase controlled loop can be stabilized. In other words, the timing of power supply switching for the driving coils relative to the counterelectromotive voltage in the driving coils will be deviated from an optimum efficient point. In order to alleviate such a phenomenon, arrangement has been made such that the timing of generation of each of the phase difference detecting pulses S1 to S6 and S0 can be set by the pulse timing selecting means 29.

Figure 10:
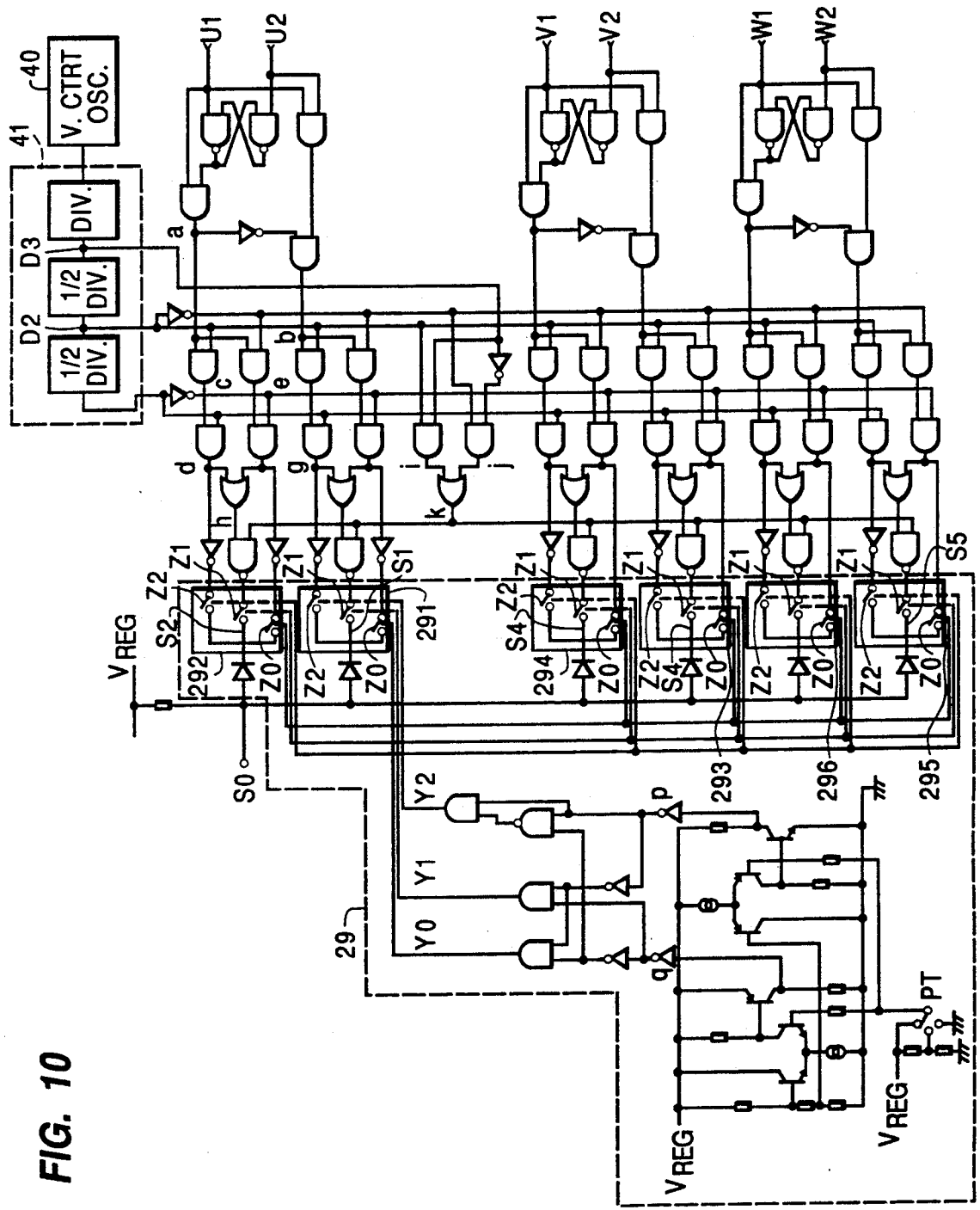
FIG. 10 is a detailed circuit diagram of a phase difference detecting pulse generator and a pulse timing selecting circuit.

As a specific construction of the pulse timing selecting circuit 29, such a circuit as shown in FIG. 10 in which it is shown together with the phase difference detecting pulse generator 28 is contemplated by way of example. In FIG. 10, like reference numerals are employed to denote like parts which are identical in function with those shown in FIG. 1. The outputs U1, U2, V1, V2, W1 and W2 of the logic circuit 42 and the outputs D1, D2 and D3 of the frequency divider 41 are applied as input signals to the phase difference detecting pulse generator. Reference numeral 29 represents the pulse timing selecting circuit 29 for selecting and setting the timing at which the phase difference detecting pulses are generated. Either one of High, Middle and Low signals is inputted to an input terminal PT, and in correspondence with the input signals, a combination of signals Y0, Y1 and Y2 is determined. Then, arrangement has been made such that depending on the combination one of switches Z0, Z1 and Z2 in each of switch blocks 291 to 296 can be switches on while the remaining two switches can be switched off.

Assuming that the High, Middle and Low signals inputted to the input terminal PT are expressed by H, M and L, respectively, and the High and Low signals at terminals p and q and the terminals Y0, Y1 and Y2 are expressed by H and L, respectively, the states of the signals at each of the above described terminals and those of the switches Z0, Z1 and Z2 can be summarized as shown in the following table.

| PT | p | q | Yo | Y1 | Y2 | Zo | Z1 | Z2 |
|---|---|---|---|---|---|---|---|---|
| H | L | L | H | L | L | ON | OFF | OFF |
| M | L | H | L | H | L | OFF | ON | OFF |
| L | H | H | L | L | H | OFF | OFF | ON |

It is noted that the switches Z0, Z1 and Z2 are switches on and off when the signals at the terminals Y0, Y1 and Y2 are High and Low, respectively.

In this way, depending on the respective states of the signals at the input terminal PT of the pulse timing selecting circuits 29, the switches Z0, Z1 and Z2 are selectively switches on and off so that the timing at which the phase difference detecting pulses S1 to S6 and S0 are generated can be determined.

By way of example, where the input terminal PT is at Middle level and the switch Z1 is switches on, the phase difference detecting pulses S2 and S0 are, as is the case with that shown in FIG. 4, generated during a D3±0.5, clock period at a reference timing which is two clock period of D3 subsequent to the time at which U1 is rendered to be Low. Also, where the input terminal PT is at a High level and the switch Z0 is switched on, as compared with that shown in FIG. 4, the phase difference detecting pulses S2 and S0 are generated during a ±0.5 clock period of D3 at a reference timing which is 1+0.5 clock period of D3 subsequent to the time at which U1 is rendered to be Low. Also, where the input terminal PT is at a Low level and the switch Z2 is switched on, as compared with that shown in FIG. 4, the phase difference detecting pulses S2 and S0 are generated during a ±0.5 clock period of D3 at a reference timing which is 2+0.5 clock period of D3 subsequent to the time at which U1 is rendered to be Low. Although for the purpose of brevity reference has been made only to S2 and S0, a similar description can apply to S1, S3, S4, S5 and S6 which are generally generated at similar timings to those discussed in connection with S2 and S0.

Accordingly, where as hereinbefore discussed the power supply timing for the driving coils relative to the counterelectromotive voltage in the driving coils deviates from the optimum efficient point, the selective setting of the timing of generation of the pulses with the use of the pulse timing selecting means is effective to compensate for the deviation wherefore the power supply timing for the driving coils relative to the counterelectromotive voltage can be caused to approach the optimum efficient point.

The reset circuit 60 shown in FIG. 1 will now be described.

The reset circuit 60 is operable, when asynchronism occurs in the phase controlled loop at the time the power is turned on or by reason of, for example, the constraint of the movable element, to initialize by clamping the output EAO of the difference amplifier 30 at the clamping level of the difference amplifier output clamping circuit 53 to assure the phase-synchronized pull of the phase controlled loop, that is, the start of the motor.

Hereinafter, the operation will be described specifically.

Figure 11:
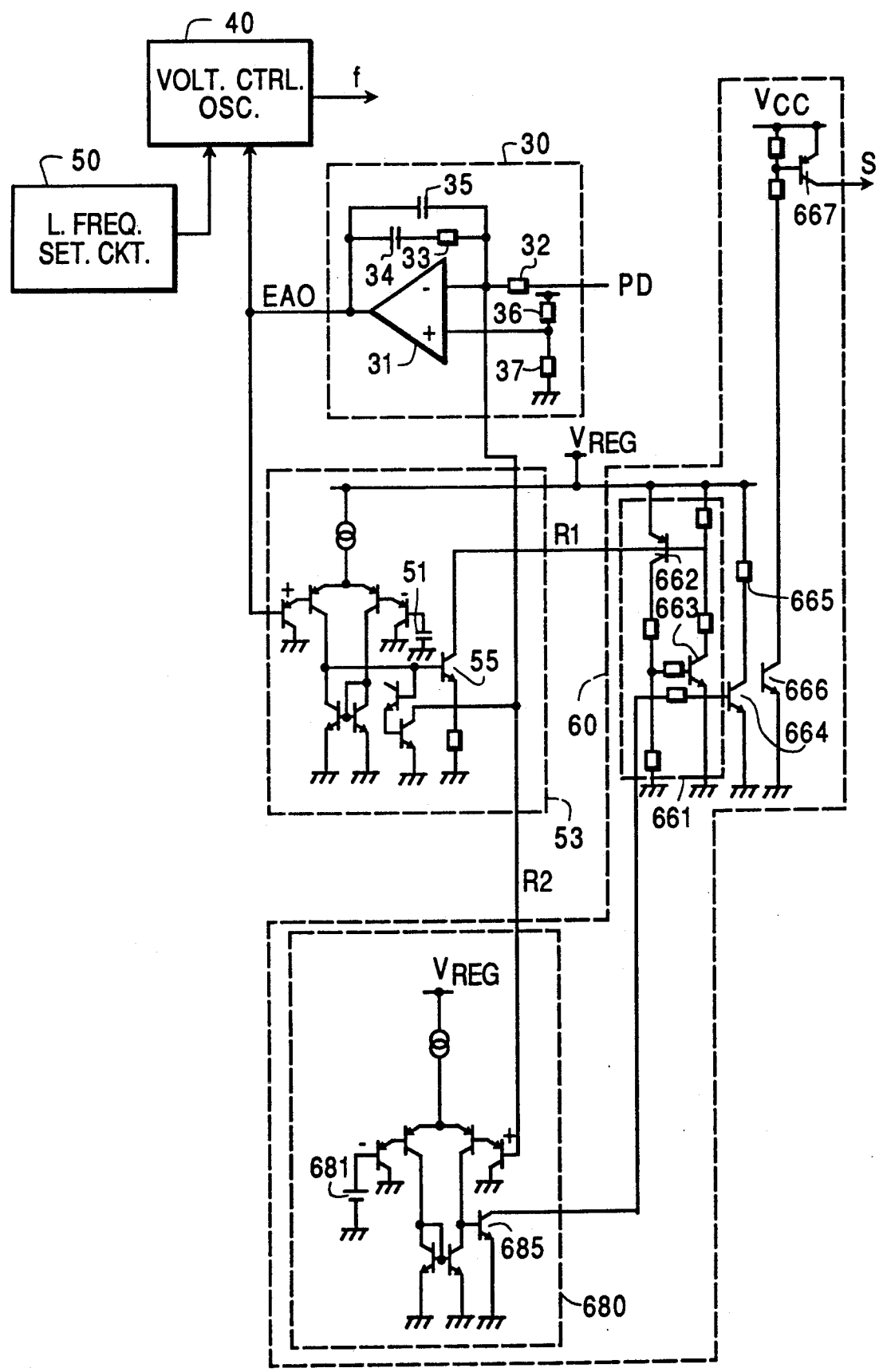
FIG. 11 is a detailed circuit diagram of the difference amplifier output clamping circuit and a resetting circuit.

While the specific circuit construction of the reset circuit 60 is shown in FIG. 11, in the event of the occurrence of the asynchronism at the time the power is turned on or in the phase controlled loop, the output EAO of the difference amplifier 30 does not generally correspond with the number of revolutions of the motor. At this time, EAO is increasing or decreasing according to the output PD of the phase difference detector 20. Where EAO is in a tendency to decrease, the oscillating frequency f of the voltage controlled oscillator 40 will be a low frequency, while where EAO is in a tendency to be naturally initialized, but in a tendency which is to increase, a tendency reverse to that during the initialization occurs.

In such a case, EAO will soon be saturated, the imaginal shortcircuit between the input terminals of the operational amplifier 31 will not be established, and therefore, the voltage at the inverting input terminal of the operational amplifier will become of a value lower than the voltage at the non-inverting input terminal thereof. This is detected by a comparator 680. In other words, an output transistor 685 of the comparator 680 is so constructed as to be switched on when the above described imaginal shortcircuit will not establish, and, therefore, once the transistor 685 is switched on, a transistor 664 is switched off by a latch circuit 661 with the consequence being that an output transistor 667 of the reset circuit 60 can be switched on. A collector output S of the output transistor 667 is connected with an S terminal of the phase difference detector 20 shown in FIG. 5 and, therefore, when the output transistor 667 is switched on, the output PD will loose a current absorbing capability. Therefore, the output PD will have only a current discharging capability, causing the output EAO of the difference amplifier 30 to drop. The drop of EAO continues until the difference amplifier output clamping circuit 53 is operated and EAO is subsequently clamped. That is to say, when EAO is clamped, the transistor 55 conducts to relieve the transistor 664 from the OFF state caused by the latch circuit 661, thereby switching the transistor 664 on. As a result thereof, the output transistor 667 of the reset circuit 60 is switched off and the current absorbing capability of the output PD is recovered, with the initialization of EAO subsequently terminated.

In this way, the reset circuit 60 detects this when the output EAO of the difference amplifier 30 increases and is saturated, thereby lowering EAO while the output PD of the phase difference detector 20 is imparted only the current discharging capability. On the other hand, at the moment EAO is clamped by the operation of the difference amplifier output clamping circuit 53, the current absorbing capability of PD is recovered with the initialization of EAO terminated accordingly.

Accordingly, by the provision of the reset circuit 60, the output EAO of the difference amplifier 30 can be initialized and the motor can be assuredly started even when at the time the power is turned on or by some other reason asynchronism occurs in the phase controlled loop.

According to the foregoing illustrated embodiment, by the provision of the so-called phase controlled loop (PLL loop) operable to control the oscillating frequency and the phase of the voltage controlled oscillator by supplying an electric power through the motor driving coils on the basis of the output of the voltage controlled oscillator at all times, then detecting the difference in phase between the power supply waveform and the counterelectromotive voltage in the driving coils with the use of the phase difference detector and controlling the phase difference to zero by the utilization of an amplified signal thereof, there is no influence brought about by the armature reaction and the motor can be driven efficiently, yet, no filtering circuit hitherto required is required. Accordingly, a large capacitance capacitor can be considerably reduced. Also, since the phase difference detector generates the phase difference detecting pulses during the power supply interrupting period for the driving coils and equivalently provides the phase difference output of the counterelectromotive voltage and the power supply switching signal by comparing the counterelectromotive voltage generated in the driving coils and the neutral point voltage during the power supply interrupting period for the driving coils, the timing the generation of the detecting pulse can be set so as to avoid the period during which spike noises tending to be generated immediately after the power supply interrupting period for the driving coils and, therefore, any possible influence brought about by the spike noises can be avoided. Moreover, since the phase difference detection is carried out during the power supply interrupting period, any possible voltage drop and its variation resulting from the power supply current generated during the power supply period and the impedance of the driving coils will bring no adverse influence. In addition, since the width of the phase difference detecting pulse generated during the power supply interrupting period is constant relative to the electrical angle of the motor or the mechanical angle and depends only on the duty of the comparison output between the counterelectromotive voltage and the neutral point voltage during the period in which the phase difference detecting pulses are generated, the phase difference detecting gain does not vary under the influence of the number of revolutions of the motor and the phase controlled loop can be operated in a stabilized manner at all times.

Also, in the illustrated embodiment, since the phase controlled loop for controlling the oscillating frequency and the phase of the voltage controlled oscillator is constructed such that the output of the voltage controlled oscillator can be supplied through the motor driving coils and the phase difference between the power supply waveform and the counterelectromotive voltage for the driving coils can be controlled to zero, the oscillating frequency of the voltage controlled oscillator o the output frequency of the frequency divider therefore assumes a frequency corresponding to the rotational speed of the motor when the phase controlled loop is in a pull state. Accordingly, as shown in FIG. 1, it is possible to provide the speed signal output terminal 202 with the motor speed signal through the transistor 200 which is selectively switched on and off according to the output of the frequency divider.

Hereinafter, a second embodiment of the present invention will be described with reference to the drawings.

Figure 12:
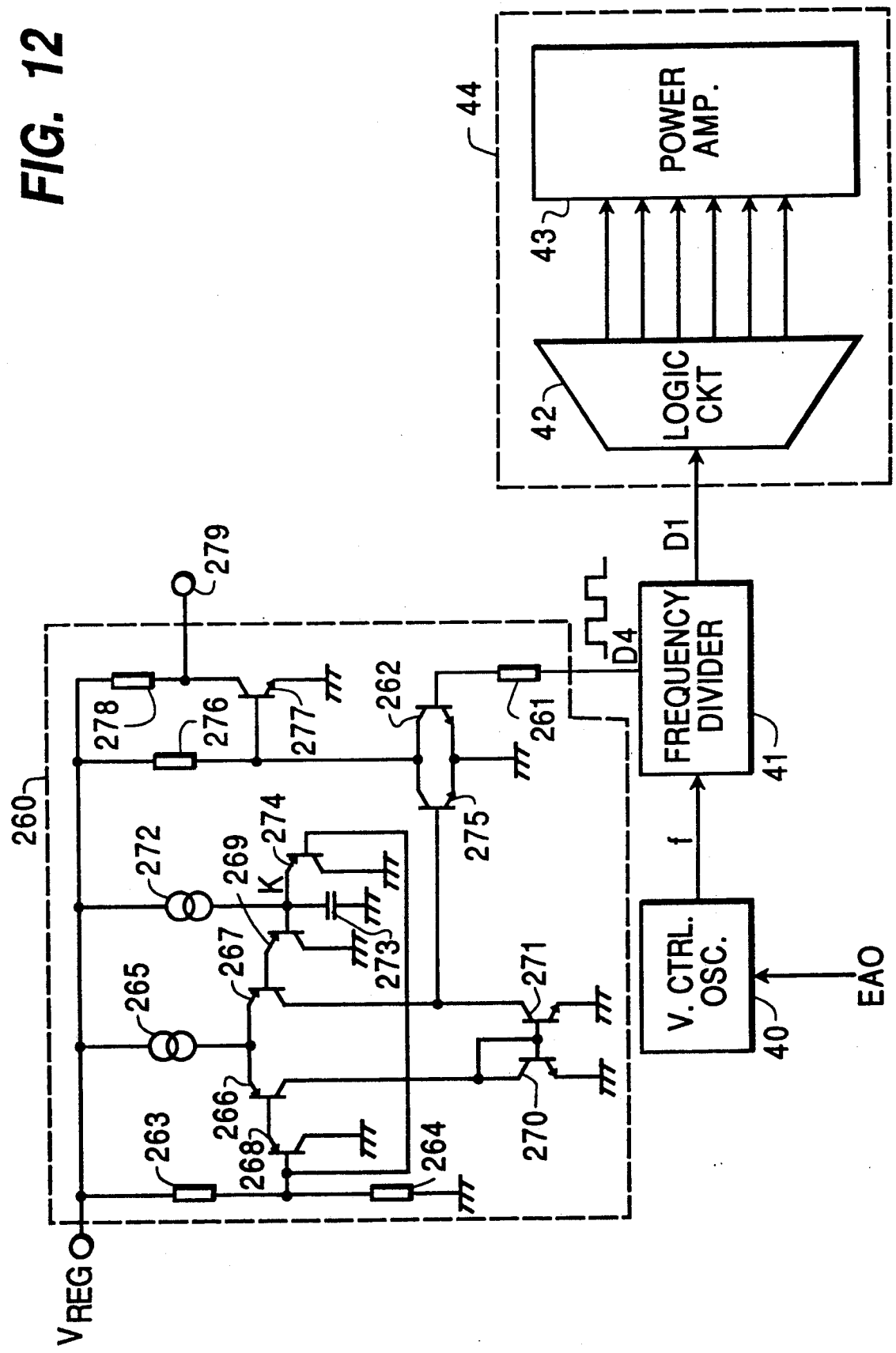
FIG. 12 is a circuit diagram of a drive device for a brushless motor according to a second embodiment of the present invention.

FIG. 12 illustrates an essential portion of the circuit construction of the driving device for the brushless motor according to the second embodiment of the present invention. It differs from the construction of FIG. 1 in that a timing circuit 260 is employed, the structure other than the use of the timing device 260 being identical with the brushless motor driving device shown in FIG. 1.

Referring to an example of the construction of the timing circuit 260, and referring to FIG. 12, the output D4 of the frequency divider 41 is connected to the base of a transistor 262 through a resistor 261. A voltage divider comprised of resistors 263 and 264 is connected between the stabilizing power source line Vreg and ground, a voltage dividing point J being connected to the base of a transistor 268 whose emitter is connected to the base of a transistor 266. The transistors 266 and 267 have their emitters connected together and also to the stabilizing power source line Vreg through a constant current source 265. The base of the transistor 267 is connected to the emitter of a collector-grounded transistor 269. The transistors 266 and 267 have their collectors connected to respective collectors of transistors 270 and 271. The bases of the transistors 270 and 271 are connected together and also connected to the collector of the transistor 270 while the emitters of the transistors 270 and 271 are grounded. A capacitor 273 is connected in series to a constant current source 272 between the stabilizing power source line Vreg and ground. A junction K between the constant current source 272 and the capacitor 273 is connected to the base of the transistor 269 and also with the emitter of a collector-grounded transistor 274. The base of the transistor 274 is connected to the voltage dividing point J. A common junction between the respective collectors of the transistors 267 and 271 is connected to the base of the transistor 275, and the emitter of the transistor 275 is connected to the emitter of the transistor 262 and also to ground. Yet, the collectors of the respective transistors 275 and 262 are connected together and also to the stabilizing power source line Vreg through a resistor 276 and the base of a transistor 277. The transistor 277 has its emitter connected to ground and its collector connected to the stabilizing power source line Vreg through a resistor 278 and also to the speed signal output terminal 279.

The operation of the brushless motor driving device of the above described construction will now be described.

When a power source voltage Vcc is applied, the stabilizing power source starts its operation with the stabilizing voltage Vreg generated and the entire circuit is therefore operated with the motor started. At this time. when the stabilizing voltage Vreg is applied to the stabilizing power source line, a constant voltage $Vreg.R_{64}/(R_{63}+R_{64})$ (wherein $R_{63}$ and $R_{64}$ represent respective resistances of the resistor 263 and 264) is generated at the base of one transistor 268 forming a part of a differential transistor pair, that is, the voltage dividing point J between the resistors 263 and 264. On the other hand, the voltage at the base of the other transistor 269 forming a part of the differential transistor pair, that is, the junction K, gradually increases with the progress of the charging of the current from the constant current source 272 on the capacitor 273. During a period in which the charging on the capacitor 273 has not yet been proceeded subsequent to the application of the stabilizing voltage Vreg and, therefore, the voltage at the point K is lower than the voltage at the point J, the transistors 267 and 266 are switched on and off, respectively, and therefore, the transistor 275 is switched on and the transistor 277 is kept in an off state at all times, with the consequence being that the speed signal output terminal 279 remains at a High level. When after the passage of a predetermined time and consequent upon the progress of the charging on the capacitor 273 the voltage at the point K becomes higher than the voltage at the point J, the transistors 267 and 266 are switched off and on, respectively, resulting in the transistor 276 being switched off and the transistor 277 assuming a state which is reverse that of the transistor 262. At this time, the transistor 262 is selectively switched on or off depending on the High or Low state of the output D4 of the frequency divider 41 and, in response to such a state, the transistor 277 is switched off or on and, therefore, a rectangular wave signal in which the High and Low states are repeated in correspondence with the output D4 of the frequency divider 41 is outputted from the speed signal output terminal 279. As hereinabove described, the timing circuit 260 is constructed so as to output a frequency signal corresponding to the output frequency of the frequency divider after the passage of the predetermined time subsequent to the start of the motor.

As hereinbefore described, by the provision of the timing circuit 260, the frequency signal is outputted at the speed signal output terminal 279 after the phase controlled loop for zeroing the phase difference between the power supply waveform for the motor and the counterelectromotive voltage in the driving coils has been set in the pull state. In other words, during a transit condition that lasts subsequent to the start of the motor and before the phase controlled loop is brought in the pull state, no frequency signal will be outputted to the speed signal output terminal 279. By so doing, since the frequency corresponding to the oscillating frequency of the voltage controlled oscillator 40 or the output frequency of the frequency divider 41 is synchronized with the motor speed after the passage of the predetermined time subsequent to the start of the motor, that is, after the phase controlled loop has been brought in the pull state, the motor speed signal can be obtained at the speed signal output terminal 279.

It is noted that, although in the embodiments shown in FIGS. 1 and 12 the motor speed signal has been described as formed on the basis of the output of the frequency divider, arrangement may be made such that the oscillating frequency of the voltage controlled oscillator itself can be used as the speed signal.

Hereinafter, a speed control device for the brushless motor according to one embodiment of the present invention will be described with reference to the drawings.

Figure 13:
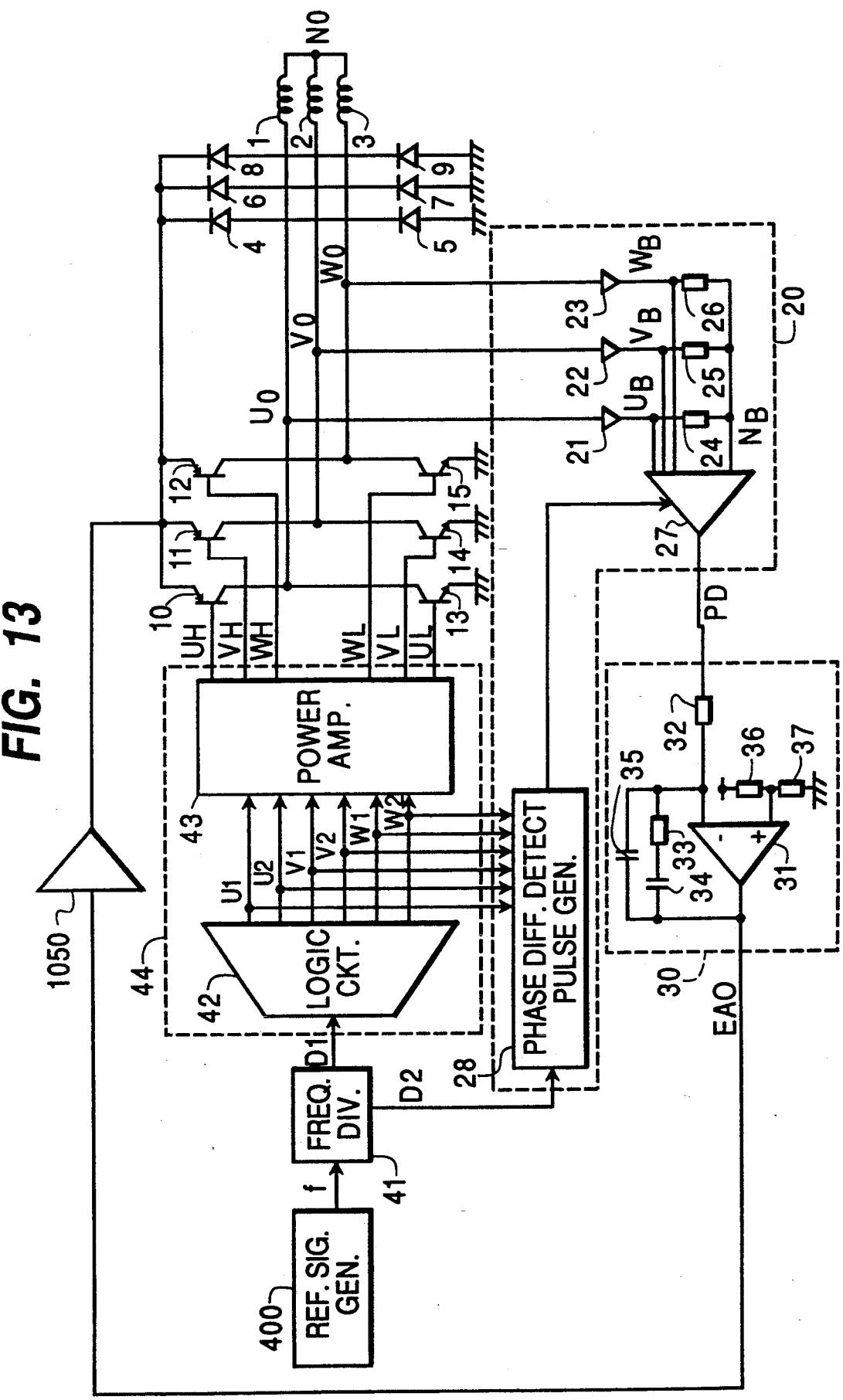
FIG. 13 is a circuit diagram of the drive device for the brushless motor in one embodiment of the present invention.

FIG. 13 illustrates the circuit construction of the speed control device for the brushless motor according to the embodiment of the present invention. In FIG. 13, the driving coils 1 to 3 are connected at their one end to each other; the driving coil 1 is connected at the other end to the anode of a diode 4, the cathode of a diode 5 and the respective collectors of driving transistors 10 and 13; the driving coil 2 is connected at the other end to the anode of a diode 6, the cathode of a diode 7 and the respective collectors of driving transistors 11 and 14; the driving coil 3 is connected at the other end to the anode of a diode 8, the cathode of a diode 9 and the respective collectors of driving transistors 12 and 15; the respective cathodes of the diodes 4, 6 and 8 and the respective emitters of the driving transistors 10, 11 and 12 are connected to an output of a buffer circuit 1050; and the respective anodes of the diodes 5, 7 and 9 and the respective emitters of the transistors 13, 14 and 15 are connected to ground. The base of each of the driving transistors 10 to 15 is connected to the output of a power amplifier 43 having its input connected to the output of the logic circuit 42. It is noted that the logic circuit 42 and the power amplifier 42 together constitute the power supply switching circuit 44. The input of the logic circuit 42 is connected to the output D1 of the frequency divider 41 which has its input connected to an output of a reference signal generator 400. The other output D2 of the frequency divider 41 and the outputs U1, U2, C1, V2, W1 and W2 from the logic circuit 42 are inputted to the phase difference detecting pulse generator 28, and ends Uo, Vo and Wo of the respective driving coils 1, 2 and 3 are inputted to buffer circuits 21, 22 and 23. The respective outputs $U_B$, $V_B$ and $W_B$ from the buffer circuits 21, 22 and 23 are inputted to the comparator 27 and are connected together through the resistors 24, 25 and 26, the common junction $N_B$ being inputted to the comparator 27. The output PD of the comparator 27 is controlled by the output from the phase difference detecting pulse generator 28. It is noted that the various component parts 21 to 28 constitute the phase difference detector 20 while the output PD constitutes the output from the phase difference detector 20. The output PD from the phase difference detector 20 is connected to the inverting input terminal of the operational amplifier 31 through the resistor 32, and the series circuit of resistor 33 and capacitor 34 and the capacitor 35 are connected between the inverting input terminal of the operational amplifier 31 and the output terminal thereof. The non-inverting input terminal of the operational amplifier 31 is applied with the predetermined bias voltage from the resistors 36 and 37. It is noted that the various component parts 31 to 37 constitute the difference amplifier 30 while an output EAO from the difference amplifier 30 is connected to the input of the buffer circuit 1050.

It is noted that the various component parts 1 to 15, 20, 30, 41 and 44 function in a manner identical with those in the brushless motor driving device of FIG. 1 which are designated by like reference numerals.

With respect to the speed control device for the brushless motor of the above described construction, the operation thereof will now be described.

Figure 14A:
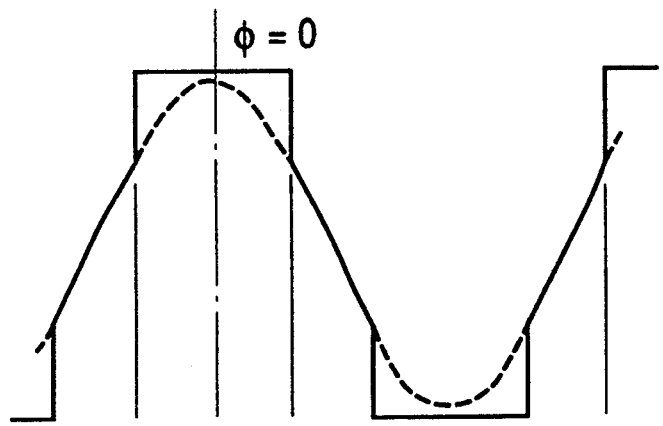
FIGS. 14A, 14B and 14C are diagrams showing the principle of operation of the circuit shown in FIG. 13.
Figure 14B:
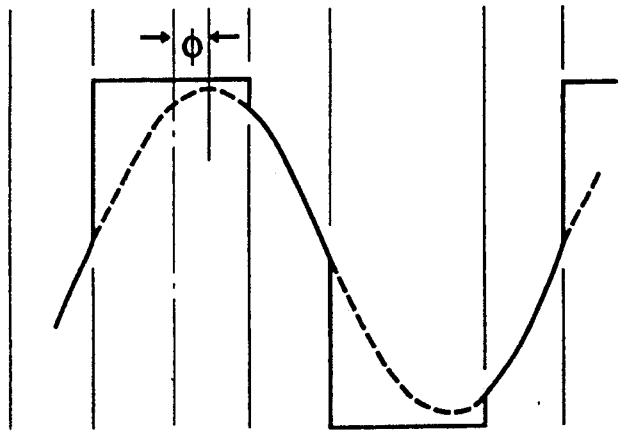
Figure 14C:
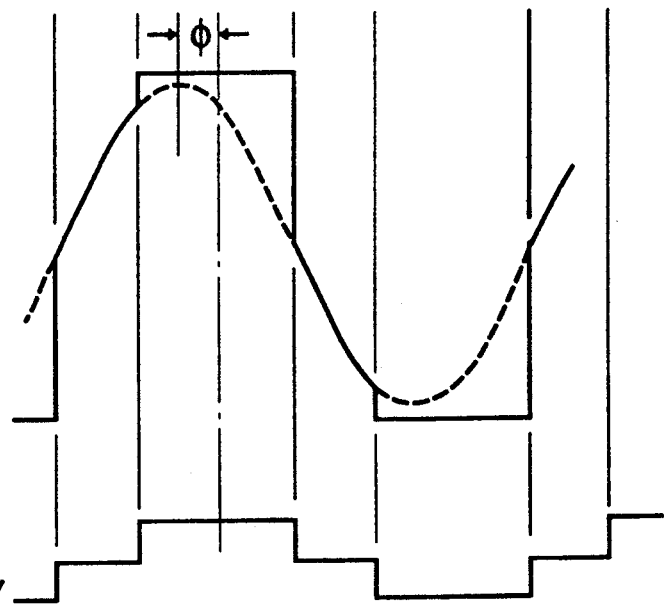

FIG. 14 is an explanatory diagram for explaining the principle of operation of the speed control device for the brushless motor according to the present invention, showing a phase relationship between a driving coil counterelectromotive voltage and a driving coil power supply waveform. FIG. 14(a) illustrates the case in which the phase relationship between the counterelectromotive voltage (dotted line) and the power supply waveform (solid line) is optimum, whereas FIGS. 14(b) and 2(c) illustrate the respective cases wherein a displacement of a phase angle $\phi$ occurs from the optimum condition. In FIG. 13, the output from the reference signal generator 400 is transmitted to the driving coils 1 to 3 through the frequency divider 41, the power supply switching circuit 44 and the driving transistors 10 to 15. Accordingly, the power supply waveforms for the driving coils 1 to 3 are synchronized with the output from the reference voltage generator 400. Also, the counterelectromotive voltage in the driving coils 1 to 3 has its frequency and phase variable depending on the number of revolutions of the motor, and the number of revolutions of the motor is controlled by the amount of electric power supplied to the driving coils, that is, the output from the buffer circuit 1050. Accordingly, by controlling the number of revolutions of the motor, that is, the frequency and phase of the counterelectromotive voltage in the driving coils on the basis of the output from the buffer circuit 1050, it is possible to control the difference in phase between the power supply waveform for the driving coils synchronized with the output from the reference signal generator 400 and the counterelectromotive voltage in the driving coils. In view of this, if a phase control loop is provided with which, where as shown in FIGS. 14(b) and 2(c) the displacement of the phase angle $\phi$ occurs between the driving coil counterelectromotive voltage and the driving coil power supply waveforms, the phase difference $\phi$ is detected by the phase difference detector 20 and then amplified by the difference amplifier 30 and the output of the buffer circuit 1050 can be controlled so as to render $\phi$ to become zero, it is possible to secure the optimum power supply condition shown in FIG. 14(a). Accordingly, it is possible to steadily and efficiently generate a motor driving torque and the motor is thus driven and, at the same time, the control of the number of revolutions using the phase control is rendered possible.

The method of detecting the phase difference $\phi$ between the driving coil counterelectromotive voltage and the driving coil power supply waveform has already been described in connection with the brushless motor driving device and, therefore, the details thereof will not be reiterated.

According to the present invention as hereinbefore described, by the provision of the phase controlled loop operable to supply the electric power to the motor driving coils in synchronism with the output of the reference signal generator, to detect and amplify the phase difference $\phi$ between the power supply waveform and the driving coil counterelectromotive voltage by the use of the phase difference detector and the difference amplifier, respectively, and to control, in response to the amplified signal, the amount of the electric power supplied to the driving coils on the basis of the output from the buffer circuit so as to render the phase difference $\phi$ to be zero, a brushless motor having no position detector for detecting the position of movable element can be efficiently driven in a stabilized manner and, at the same time, the control of the number of revolutions using the phase control is rendered possible.

Figure 15:
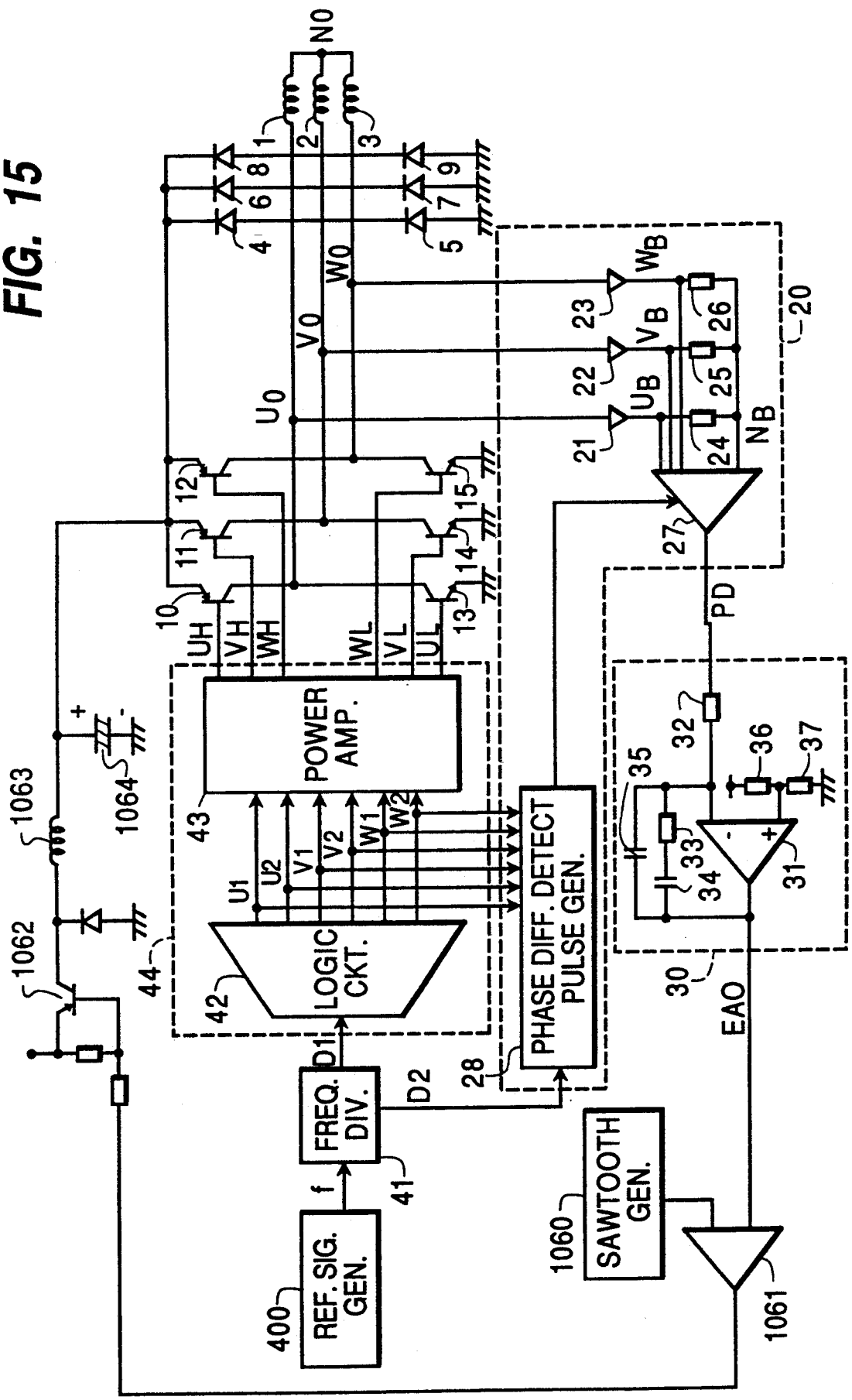
FIGS. 15 and 16 are circuit diagrams of the drive device for the brushless motor according to other embodiments of the present invention, respectively.
Figure 16:
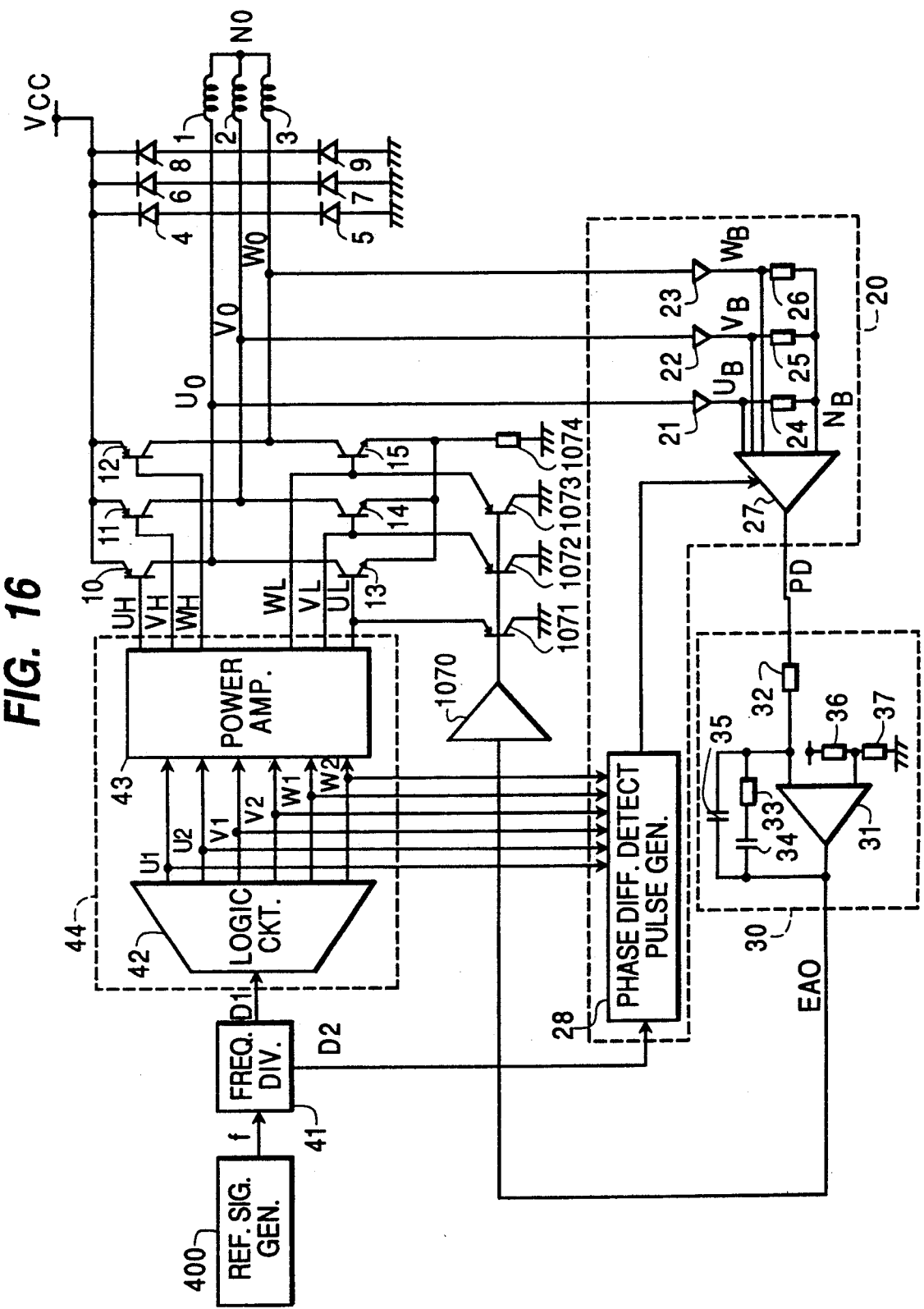

It is noted that, although in FIG. 13 the amount of the electric power to the driving coils 1 to 3 has been controlled by the buffer circuit 1050, it may be possible to control it with a smoothened output obtained through an inductance 1063 and a capacitor 1064 by comparing the output EAO of the difference amplifier 30 with an output of a sawtooth wave generator 1060 as shown in FIG. 15 and switching a transistor 1062 in dependence on the comparison output. Also, as shown in FIG. 16, the output currents of the driving transistors 13 to 15 may be controlled in dependence on the output EAO of the difference amplifier 30 by use of a buffer circuit 1070, transistors 1071 to 1073 and a motor current detecting resistor 1074. While in the embodiment of the present invention the case is shown with a three-phase total wave drive system, a brushless motor driving device of a system similar to that of the present invention can be realized even in other drive systems, for example, a two-phase total wave drive system, a two-phase half wave drive system or a three-phase half wave drive system.

INDUSTRIAL APPLICABILITY

The brushless motor driving device of the present invention includes a plurality of phases of motor driving coils; a plurality of driving transistors connected with to the driving coils; a voltage controlled oscillator for outputting a signal having an appropriate frequency; a power supply switching circuit for forming a power supply switching signal for the driving coils on the basis of a frequency signal corresponding to the frequency of oscillation of the voltage controlled oscillator; a phase difference detector having a comparator for generating a phase difference detecting pulse having a predetermined phase relationship with the power supply switching signal during a period in which no electric power is supplied to the driving coils, and also for comparing a counterelectromotive voltage generated in the driving signals with a neutral point voltage of the driving coils during a period in which the phase difference detecting pulse is generated, the phase difference detector being operable to detect an equivalent phase difference between the power supply switching signal and the counterelectromotive voltage in reference to an output from the comparator; and a difference amplifier for amplifying an output from the phase difference detector and for generating an output which is in turn applied to the voltage controlled oscillator. With this construction, it is possible to realize the excellent brushless motor drive device which does not require the use of the hitherto required filtering circuit and is therefore capable of considerably reducing the use of a of high capacitance capacitor and which is free from such problematic variations resulting from the spike noises contained in the driving coil power supply waveform and from the supplied power and the impedance of the driving coils and a variation in power source voltage and load and, also, the lowering of the efficiency resulting from the armature reaction. Also, by the provision of the lowest frequency setting circuit, the oscillating frequency of the voltage controlled oscillator can be set to the lowest frequency at the time the power is turned on to thereby generate the revolving magnetic field at a sufficient speed for the movable element to follow up so that the motor can be assuredly started. Yet, by the provision of the difference amplifier output clamping circuit, the quick phase synchronism of the phase controlled loop is possible to assuredly start the motor by clamping the level of the difference amplifier output EAO at the level at which the oscillating frequency of the voltage controlled oscillator is increased.

Also, by the provision of the pulse timing selecting means, the timing at which the phase difference detecting pulses can be generated can be determined and, therefore, it is possible to render the timing at which the electric power is supplied to the driving coils relative to the counterelectromotive voltage in the driving coils to approach the optimum efficient point.

By the provision of the reset circuit, the difference amplifier output can be initialized even when the power is turned on or in the event of the occurrence of a deviation in synchronism of the phase controlled loop and, therefore, the motor can be assuredly started.

By the employment of the construction wherein the frequency signal corresponding to the oscillating frequency of the voltage controlled oscillator or output frequency of the frequency divider operable to divide the oscillating frequency of the voltage controlled oscillator is outputted as the speed signal, the motor speed detection is possible without the employment of a speed detector, such as a hole element for the speed detection, or without specially connecting a tachometer to the motor. Also, since an arrangement has been made such that the frequency signal can be obtained from the voltage controlled oscillator or the frequency divider therefor, the speed detecting frequency can be sufficiently increased and, therefore, a highly accurate quick control of a high response is possible where the speed control is desired.

In addition, by integrating into an IC, a brushless motor drive device having an excellent performance and having an extremely minimized number of externally fitted parts can be realized at reduced costs.

Moreover, by constructing the phase controlled loop so as to be operable to supply the electric power to the motor driving coils in synchronism with the output of the reference signal generator, to detect and amplify the phase difference $\phi$ between the power supply waveform and the driving coil counterelectromotive voltage by the use of the phase difference detector and the difference amplifier, respectively, and to control, in response to the amplified signal as the torque commanding signal, the amount of the electric power supplied to the driving coils, a brushless motor having no position detector for detecting the position of the movable element can be efficiently driven in a stabilized manner and, at the same time, the phase control of the number of revolutions of the motor is possible. Accordingly, by integrating together into an IC, the brushless motor drive device extremely excellent in performance and having an extremely minimized number of externally fitted parts and, therefore, low in price and compact in size, yet, employing the control of the number of revolutions based on the highly accurate phase control can be realized.

We claim:

1. A brushless motor driving device comprising:
   a plurality motor driving coils of different phases;
   a plurality of driving transistors, coupled to said motor driving coils, for periodically supplying an electric power to said motor driving coils;
   a voltage controlled oscillator;
   a power supply switching means for generating a power supply switching signal for driving said motor driving coils on the basis of a frequency signal corresponding to a frequency of oscillation of said voltage controlled oscillator;
   a phase difference detecting means for detecting a difference between the power supply switching signal and a counterelectromotive voltage generated in said motor driving coils during a period in which no electric power is supplied to said motor driving coils;
   a difference amplifying means for amplifying an output from the phase difference detecting means and for outputting a thus amplified signal to said voltage controlled oscillator; and
   a pulse timing selected means for selecting a pulse timing;
   said phase difference detecting means comprising a phase difference detecting pulse generator for generating a phase difference detecting pulse having a predetermined phase relationship with respect to the power supply switching signal at the pulse timing selected by said pulse timing selecting means, and a comparator for comparing, in response to an output pulse signal from the phase difference detecting pulse generator, the counterelectromotive voltage generated in said motor driving coils with a neutral point voltage of said motor driving coils.

2. A brushless motor driving device comprising:
   a plurality motor driving coils of different phases;
   a plurality of driving transistors, coupled to said motor driving coils, for periodically supplying an electric power to said motor driving coils;
   a power supply switching means for sequentially transmitting a power supply switching signal to said motor driving transistors;
   a voltage controlled oscillator for applying a signal of an appropriate frequency to said power supply switching means;
   a phase difference detecting means for detecting a phase difference between the power supply switching signal and a counterelectromotive voltage generated in said motor driving coils during a period in which no electric power is supplied to said motor driving coils;
   a difference amplifier for amplifying an output from the phase difference detecting means and for outputting a thus amplified signal to said voltage controlled oscillator;
   a lowest frequency setting means for setting the lowest oscillating frequency of said voltage controlled oscillator; and,
   a difference amplifier output clamping means for clamping an output of said difference amplifier at a predetermined level.

3. A brushless motor driving device comprising:
   a plurality motor driving coils of different phases;

a plurality of driving transistors, coupled to said motor driving coils, for periodically supplying an electric power to said motor driving coils;

a power supply switching means for sequentially transmitting a power supply switching signal to said motor driving transistors;

a voltage controlled oscillator for applying a signal of an appropriate frequency to said power supply switching means;

a phase difference detecting means for detecting a phase difference between the power supply switching signal and a counterelectromotive voltage generated in said motor driving coils during a period in which no electric power is supplied to said motor driving coils;

a difference amplifier for amplifying an output from the phase difference detecting means and for outputting a thus amplified signal to said voltage controlled oscillator; and a frequency divider for dividing the frequency of oscillation of the voltage controlled oscillator, an output from said frequency divider being supplied to the power switching means, a frequency signal corresponding to one of the frequency of oscillation of said voltage controlled oscillator and the frequency of the output from said frequency divider being outputted as a motor speed signal.

4. The brushless motor driving device as claimed in claim 3, wherein one of said voltage controlled oscillator and said frequency divider has an output connected to a timing means for outputting, after a predetermined time subsequent to a start-up of the brushless motor, the frequency signal as the motor speed signal.

5. A brushless motor driving device comprising:

a plurality of motor driving coils of different phases;

a plurality of driving transistors, coupled to said motor driving coils, for supplying an electric power to said motor driving coils;

a power supply switching means for sequentially transmitting a power supply switching signal for driving said motor driving coils to said driving transistors;

a reference signal generator means for inputting a signal having an appropriate frequency to the power supply switching circuit;

a phase difference detector means for detecting a phase difference between the counterelectromotive voltage generated in said motor driving coils and the power supply switching signal during an interruption of the supply of electric power to said motor driving coils; and, a difference amplifier for amplifying an output from said phase difference detector, an output of said difference amplifier being used as a torque commanding signal.

* * * * *